(12) United States Patent
Geismann et al.

(10) Patent No.: US 9,273,225 B2
(45) Date of Patent: Mar. 1, 2016

(54) SILOXANE ORGANIC HYBRID MATERIALS PROVIDING FLEXIBILITY TO EPOXY-BASED COATING COMPOSITIONS

(75) Inventors: Christian Geismann, Bergisch Gladbach (DE); Vikram Kumar, Tarrytown, NY (US); Constantine Kondos, White Plains, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 744 days.

(21) Appl. No.: 13/611,791

(22) Filed: Sep. 12, 2012

(65) Prior Publication Data

US 2014/0073720 A1    Mar. 13, 2014

(51) Int. Cl.
| | |
|---|---|
| *C08L 63/00* | (2006.01) |
| *C09D 163/00* | (2006.01) |
| *C09J 163/00* | (2006.01) |
| C08G 77/16 | (2006.01) |
| C08G 77/18 | (2006.01) |
| C08G 77/00 | (2006.01) |

(52) U.S. Cl.
CPC ............... *C09D 163/00* (2013.01); *C08L 63/00* (2013.01); *C09J 163/00* (2013.01); C08G 77/16 (2013.01); C08G 77/18 (2013.01); C08G 77/80 (2013.01)

(58) Field of Classification Search
CPC ...................................... C08L 63/00
USPC ........................................ 523/435
See application file for complete search history.

(56) References Cited

U.S. PATENT DOCUMENTS

| | | | |
|---|---|---|---|
| 5,364,888 A | 11/1994 | Aoki et al. | |
| 5,618,860 A | 4/1997 | Mowrer et al. | |
| 5,804,616 A * | 9/1998 | Mowrer et al. | 523/421 |
| 6,344,520 B1 | 2/2002 | Greene | |
| 6,713,586 B2 | 3/2004 | Greene | |
| 7,351,783 B1 * | 4/2008 | Perala et al. | 528/27 |
| 7,459,515 B2 | 12/2008 | Gommans et al. | |
| 8,232,355 B2 * | 7/2012 | Takahashi et al. | 525/476 |
| 2004/0110860 A1 | 6/2004 | Frances | |
| 2006/0051695 A1 * | 3/2006 | Yuasa et al. | 430/111.35 |
| 2006/0058451 A1 | 3/2006 | Gommans et al. | |
| 2007/0213492 A1 | 9/2007 | Mowrer et al. | |
| 2008/0075871 A1 * | 3/2008 | Ambrose et al. | 427/387 |
| 2008/0188609 A1 * | 8/2008 | Agarwal et al. | 524/504 |
| 2011/0201763 A1 | 8/2011 | Noro | |
| 2012/0214925 A1 * | 8/2012 | Gubbels et al. | 524/413 |
| 2013/0234070 A1 * | 9/2013 | Mowrer | 252/389.2 |

FOREIGN PATENT DOCUMENTS

| | | |
|---|---|---|
| EP | 1026204 | 8/2000 |
| EP | 1408083 | 4/2004 |

OTHER PUBLICATIONS

The Dow Chemical Company, Product Information, "D.E.R.™ 736 Liquid Epoxy Resin", Form No. 296-01507-0109X-TD, p. 1-3 (1995).
Resolution Performance Products, Product Data Sheet, "EPONEX™ Resin 1510", 2 Pages (Jun. 2004).
Hexion Specialty Chemicals, Technical Data Sheet, "EPONEX™ Resin 1510", p. 1-2 (Dec. 2005).
Highbeam Research, "Article: Ameron Awarded Patent on PSX 700 High-Performance Coating Products", Business Wire Press Releases, p. 1-4 (May 1997).

* cited by examiner

*Primary Examiner* — Megan McCulley
(74) *Attorney, Agent, or Firm* — James C. Abruzzo

(57) ABSTRACT

Disclosed herein are epoxy-based compositions that include a polysiloxane flexibilizer and amino-functional alkoxysilane, which provides flexibility, hardness and gloss to such compositions and that are useful as coatings, adhesives, sealants and composites. Also disclosed are cured compositions and substrates coated with such epoxy-based compositions.

28 Claims, No Drawings

SILOXANE ORGANIC HYBRID MATERIALS PROVIDING FLEXIBILITY TO EPOXY-BASED COATING COMPOSITIONS

FIELD OF THE INVENTION

The present invention relates to epoxy-based compositions that include a polysiloxane flexibilizer and amino-functional alkoxysilane, which provides flexibility, hardness and gloss to such compositions. These compositions are useful as coatings, adhesives, sealants and composites.

BACKGROUND OF THE INVENTION

Epoxy-based resin compositions are known in the prior art. These compositions are useful as adhesives, sealants, composites, and especially coatings. Current high-end protective epoxy-based coatings typically contain an epoxy resin, an alkoxy functional siloxane resin, a polyamine or polyamide curative (hardener), pigments, a leveling agent, and additives for corrosion protection. While such epoxy-based coating compositions are useful in forming protective coatings to an underlying substrate, the coatings formed tend to crack after outdoor exposure for a period of time.

U.S. Pat. No. 5,618,860 discloses an epoxy polysiloxane coating composition that was cured with a difunctional amine hardener and/or aminosilane in the presence of a catalyst. The polysiloxanes were linear polysiloxane polymers having pendent hydroxyl, alkyl, aryl and/or alkoxy groups and terminal hydroxyl, alkoxy or aryloxy groups, such as hydroxyl-terminated polydimethylsiloxane. Unfortunately, coatings made using hydroxyl-terminated polydimethylsiloxane coating compositions tend to provide less flexibility than otherwise might be desired.

Selection of a flexibilizer is not straightforward since the flexibilizer has to satisfy a number of criteria, for example, being compatible with the epoxy-based composition, having the ability to become part of the coating matrix upon curing, and being effective in reducing the brittleness while maintaining gloss, thus improving the weatherability of the cured composition.

Accordingly, there is a need in the coating, adhesive, sealant and composite community for a flexibilizer, which improves flexibility and weatherability of epoxy-based compositions, while maintaining hardness and gloss. The present invention provides an answer to that need.

SUMMARY OF THE INVENTION

In accordance with one aspect of the invention, there is provided an epoxy-based composition comprising:
(a) an epoxide resin having at least one 1,2-epoxy group per molecule with an epoxide equivalent weight in the range of from 100 to 2000;
(b) an amino-functional alkoxysilane;
(c) a flexibilizer having the general Formula (I):

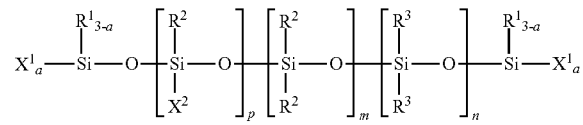

Formula (I)

wherein:
each occurrence of $R^1$ is independently an alkyl group having from 1 to 6 carbon atoms, a phenyl group or an arenyl group having 7 to 12 carbon atoms;
each occurrence of $R^2$ is independently an alkyl group having from 1 to 6 carbon atoms;
each occurrence of $R^3$ is independently a phenyl group or an arenyl group having 7 to 12 carbon atoms;
each $X^1$ is independently a hydroxyl group, an alkoxy group having from 1 to 6 carbon atoms, or an alkoxy group having from 1 to 6 carbon atoms and at least one ether or ester functional group;
each $X^2$ is independently a hydroxyl group, an alkoxy group having from 1 to 6 carbon atoms, an alkoxy group having from 1 to 6 carbon atoms and at least one ether or ester functional group, or a group with the Formula (II):

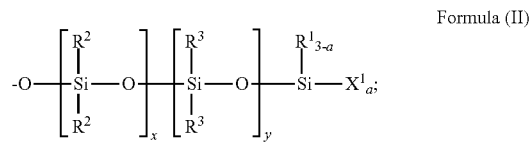

Formula (II)

each occurrence of the subscripts a, m, n, p, x and y is independently an integer wherein a is 1 to 3; m is 0 to 500, n is 1 to 500, p is 0 to 10, x is 0 to 50, and y is 0 to 50 with the provisos that
(i) the molar ratio of m to n is from 0 to 15, and
(ii) the molar ratio of p to n is from 0 to 1; and
(d) at least one curing catalyst.

Not to be bound by any theory, it is believed that the flexibilizer (c) is compatible with the epoxy resin composition, the $X^1$ group reacts with the alkoxysilyl group of the amino-functional alkoxysilane (b), and the amino group of the amino-functional alkoxysilane (c) reacts with the epoxy group of the epoxy resin (a).

Upon cure, the cured epoxy-based composition of the invention formed from the epoxy-based composition containing the epoxy resin (a), the amino-functional alkoxysilane (b), the flexibilizer (c) and curing catalyst (d), exhibits a superior performance on flexibility as compared to the epoxy resin compositions formed from curing compositions that do not contain the flexibilizer (c).

In accordance with another aspect of the invention, the epoxy-based composition of the invention is a coating, adhesive, sealant or composite.

In accordance with yet another aspect of the invention, there is provided a substrate at least partially in contact with the epoxy-based compositions of the invention.

These and other aspects will become apparent upon reading the detailed description of the invention.

DETAILED DESCRIPTION OF THE PREFERRED EMBODIMENT

In one embodiment, there is provided an epoxy-based composition comprising:
(a) an epoxide resin having at least one 1,2-epoxy group per molecule with an epoxide equivalent weight in the range of from 100 to 2000;
(b) an amino-functional alkoxysilane;
(c) a flexibilizer having the general Formula (I):

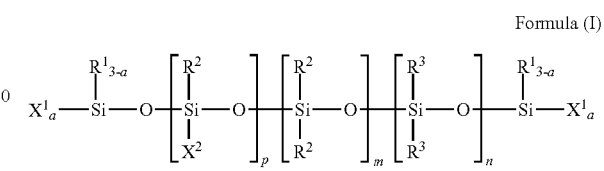

Formula (I)

wherein:
each occurrence of $R^1$ is independently an alkyl group having from 1 to 6 carbon atoms, a phenyl group or an arenyl group having 7 to 12 carbon atoms;

each occurrence of $R^2$ is independently an alkyl group having from 1 to 6 carbon atoms;

each occurrence of $R^3$ is independently a phenyl group or an arenyl group having 7 to 12 carbon atoms;

each $X^1$ is independently a hydroxyl group, an alkoxy group having from 1 to 6 carbon atoms, or an alkoxy group having from 1 to 6 carbon atoms and at least one ether or ester functional group;

each $X^2$ is independently a hydroxyl group, an alkoxy group having from 1 to 6 carbon atoms, an alkoxy group having from 1 to 6 carbon atoms and at least one ether or ester functional group, or a group with the Formula (II):

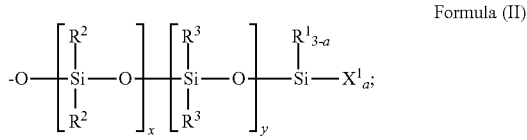

Formula (II)

each occurrence of the subscripts a, m, n, p, x and y is independently an integer wherein a is 1 to 3; m is 0 to 500; n is 2 to 500, p is 0 to 10, x is 0 to 50; and y is 0 to 50, with the provisos that (i) the molar ratio of m to n is from 0 to 15, and (ii) the molar ratio of p to n is from 0 to 1; and (d) at least one curing catalyst.

The epoxy-based composition of the invention can suitably be used in formulating adhesive, sealant, composite and especially coating compositions.

The term "alkyl" means any monovalent, saturated straight or branched hydrocarbon group.

The term "cycloalkyl" means any monovalent, saturated hydrocarbon group containing cyclic structure and includes bicyclic, tricyclic and higher cyclic structures as well as the aforementioned cyclic structures further substituted with alkyl and/or alkenyl groups.

The term "alkenyl" means any monovalent straight or branched hydrocarbon group containing one or more carbon-carbon double bonds where the site of attachment of the group can be either at a carbon-carbon double bond or elsewhere therein.

The term "alkylene" means any divalent, saturated straight or branched hydrocarbon group.

The term "cycloalkylene" means any divalent, saturated hydrocarbon group containing cyclic structure and includes bicyclic, tricyclic and higher cyclic structures as well as the aforementioned cyclic structures further substituted with alkyl and/or alkenyl groups. Examples of alkyl include methyl, ethyl, propyl, isopropyl, butyl hexyl and neohexyl.

Examples of cycloalkyl includes cyclopentyl, cyclohexyl and bicyclo[2.2.1]heptyl. Examples of alkenyls include vinyl, propenyl, allyl and methallyl. Examples of alkenylene include ethylene, propylene, isopropylene, butylene and hexylene. Examples of cycloalkylene include cyclopentylene, cyclohexylene and 4-[1-(4-cyclohexyl)-1-methylethyl]-cyclohexyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups.

The term "arenyl" means any aryl group (as defined herein) in which one or more hydrogen atoms have been substituted by the same number of like and/or different alkyl groups (as defined herein).

The term "arylene" means any divalent aromatic hydrocarbon group, and the term "arenylene" means any arylene group (as defined herein) in which one or more hydrogen atoms have been substituted by the same number of like and/or different alkyl groups (as defined herein).

Examples of aryl include phenyl and naphthalenyl. Examples of aralkyls include benzyl and phenethyl. Examples of arenyls include tolyl and xylyl. Examples of arylenes include phenylene and naphthalene.

Epoxy Resin (a)

The epoxy resin (a) is an organic compound or mixtures of organic compounds having at least one 1,2-epoxy group per molecule with an epoxide equivalent weight in the range of from 100 to 2000 grams per equivalent.

In one embodiment, the epoxy resin (a) has the general Formula (III):

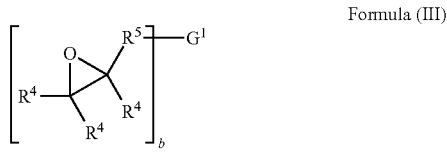

Formula (III)

wherein:

each occurrence of $R^4$ is independently hydrogen, an alkyl group of from 1 to 8 carbon atoms, a phenyl group or an aralkyl or arenyl group of from 7 to 12 carbon atoms;

each occurrence of $R^5$ is a divalent organic group of from 1 to 12 carbon atoms or a chemical bond;

$G^1$ is a divalent or polyvalent organic group containing from 1 to 1,000 carbon atoms; and b is 2 to 8.

In another embodiment, the epoxy resin (a) has Formula (III), wherein $R^4$ is hydrogen or methyl; $R^5$ is a chemical bond, or a —C(=O)—, —C(=O)O—, —O—, —$C_cH_{2c}$—, —$C_cH_{2c}$O—, —$C_cH_{2c}$OC(=O)—, —$C_cH_{2c}$C(=O)—, —$C_cH_{2c}$C(=O)O— or —$(C_cH_{2c}O)_d$— group, wherein each occurrence of c and d is independently an integer where c is from 1 to 8 and d is from is 1 to 6; and $G^1$ is a divalent or polyvalent hydrocarbon group containing from 1 to 700 carbon atoms derived from an linear or branched alkyl, cycloalkyl, alkenyl, aralkyl, aryl, arenyl or a group derived from a heterocarbon containing from 1 to 700 carbon atoms at least one functional group selected from the group consisting of —O—, N=, —OH, —S—, —C(=O)O—, —C(=O)OH, and —C(=O)S—, and b is 2 to 5.

Representative and non-limiting examples of $R^4$ include hydrogen, methyl, ethyl, propyl, isobutyl, phenethyl, phenyl, tolyl, xylyl. Preferably, $R^4$ is hydrogen or methyl.

Representative and non-limiting examples of $R^5$ include a chemical bond, methylene, ethylene, propylene group, —$CH_2$O— and —$CH_2$C(=O)O—.

Representative and non-limiting examples of $G^1$ include hydrogenated cyclohexane dimethyl, hydrogenated bisphenol A, bisphenol A,

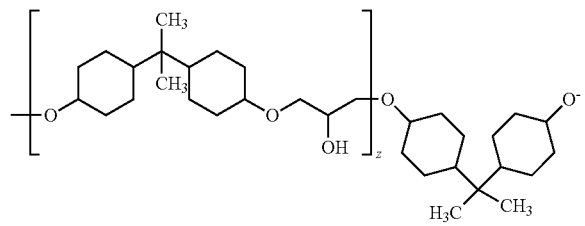

where z is 0 to 12;

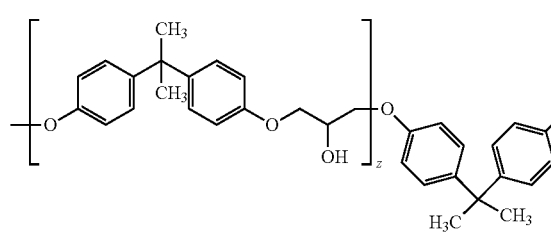

where z is 0 to 12;

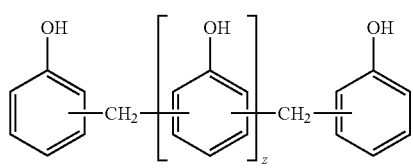

where z is 0 to 12;

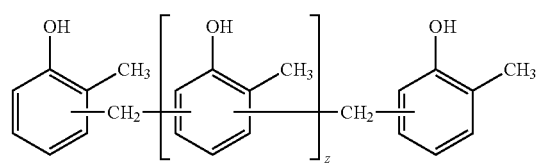

where z is 0 to 10;

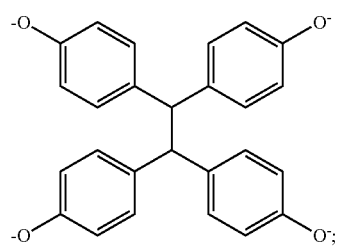

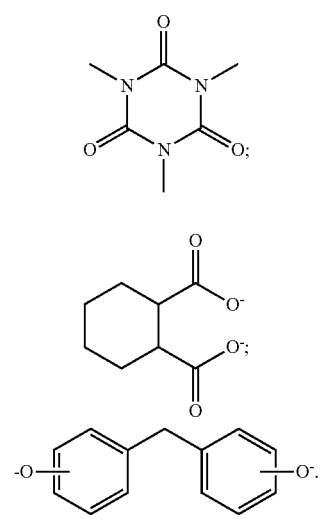

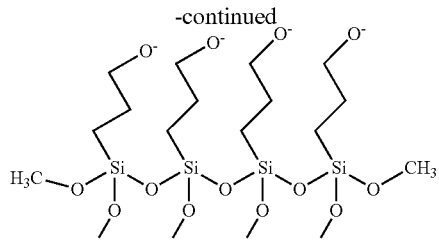

-continued

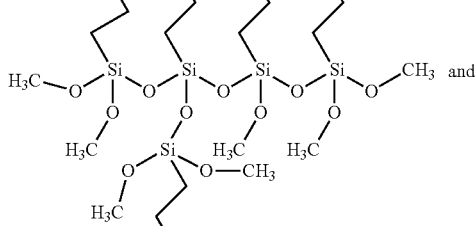

Representative and non-limiting examples of the epoxy resin (a) include 2-{4-[1-methyl-1-(4-oxiranylmethoxy-cyclohexyl)-ethyl]-cyclohexyloxymethyl}-oxirane, diglycidyl ether of bisphenol A, hydrogenated diglycidyl ether of bisphenol A, epoxy phenol novolac resins, epoxy cresol novolac resins, diglycidyl ether of bisphenol F, tetradlycidyl ether of tetrakis(4-hydroxyphenyl)ethane, triglycidyl-p-aminophenol, N,N,N',N'-tetraglycidyl-4,4'-diaminodiphenylmethane, triglycidyl isocyanurate, [methyl-(3-oxiranylmethoxy-propyl)-hydroxy-siloxy]-methyl-(3-oxiranylmethoxy-propyl)-silanol and diglycidyl ether of hexahydrophthalic acid.

Preferably the epoxide resins contain glycidyl ether or ester groups, are liquid and have weight per epoxide in the range of from about 100 to 500.

Preferred epoxide resins are non-aromatic hydrogenated cyclohexane dimethanol and diglycidyl ethers of hydrogenated Bisphenol A-type epoxy resin, such as Epon DPL-862, Eponex 1510, Heloxy 107 and Eponex 1513 (hydrogenated bisphenol A-epichlorohydrin epoxy resin) from Shell Chemical in Houston, Tex.; Santolink LSE-120 from Monsanto located in Springfield, Mass.; Epodil 757 (cyclohexane dimethanol diglycidylether) from Pacific Anchor located in Allentown, Pa.; Araldite XUGY358 and PY327 from Ciba Geigy located in Hawthorne, N.Y.; Epirez 505 from Rhone-Poulenc located in Louisville, Ky.; Aroflint 393 and 607 from Reichold located in Pensacola, Fla.; and ERL4221 from Union Carbide. Other suitable non-aromatic epoxy resin include DER 732 and DER 736. In one embodiment, the non-aromatic epoxide resin suitable for use in the composition of the invention is a cycloaliphatic epoxy resin selected from the group consisting of hydrogenated Bisphenol A diglycidylether, cyclohexane dimethanol diglycidyl ether, methyl-(3-oxiranylmethoxy-propyl)-functional polysiloxanes, such as Silquest* MP200, and combinations thereof.

In certain embodiments, epoxy resin (a) is present in the composition in an amount ranging from 10 to 80 percent by weight, more particularly from 20 to 50 percent by weight, or, in some cases, even more particularly from 30 to 40 percent by weight, with the weight percents being based on the total weight of components (a), (b), (c) and (d) of the epoxy-based composition.

Amino-Functional Alkoxysilane (b)

The amino-functional alkoxysilane (b) is an organosilicon compound having at least one primary or secondary amino group bonded to a organic group and at least one alkoxysilyl group bonded to said organic group.

In one embodiment, the amino-functional alkoxysilane has the general Formulae (IV) or (V):

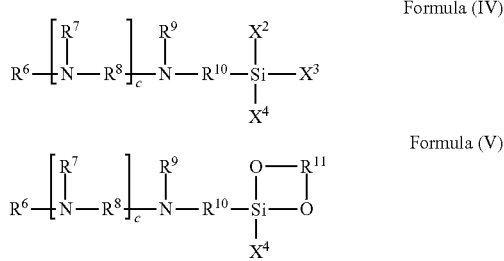

wherein:

each $R^6$, $R^7$ and $R^9$ is independently a hydrogen or a monovalent hydrocarbon group containing from 1 to 12 carbon atoms selected from the group consisting of straight chain alkyl, branched chain alkyl, cycloalkyl, aralkyl, alkenyl, aryl and arenyl;

each $R^8$ and $R^{10}$ is independently a divalent hydrocarbon group containing from 1 to 12 carbon atoms selected from the group consisting of straight chain alkylene, branched chain alkylene, cyloalkylene, aralkylene, alkenylene, arylene or arenylene;

$R^{11}$ is a divalent hydrocarbon group containing from 1 to 12 carbon atoms selected from the group consisting of straight chain alkylene, branched chain alkylene, cyloalkylene, aralkylene, alkenylene, arylene or arenylene or a divalent organic group containing from 1 to 12 carbon atoms and at least one functional group selected from hydroxyl group, ether group and ester group;

$X^2$ is $-OR^{12}$, wherein $R^{12}$ is a hydrogen, a monovalent hydrocarbon group containing from 1 to 12 carbon atoms selected from the group consisting of straight chain alkyl, branched chain alkyl, cycloalkyl, aralkyl, alkenyl, aryl and arenyl or a monovalent organic group containing from 1 to 12 carbon atoms and at least one functional group selected from hydroxyl group, ether group and ester group;

each $X^3$ and $X^4$ is independently $X^2$, a methyl or a phenyl group; and the subscript c is an integer wherein c is 1 to 3.

Representative and non-limiting aminosilanes include (methoxy-dimethyl-silanyl)-methylamine, (dimethoxy-methyl-silanyl)-methylamine, (trimethoxy-silanyl)-methylamine, 2-(methoxy-dimethyl-silanyl)-ethylamine, 3-(dimethoxy-methyl-silanyl)-ethylamine, 2-(trimethoxy-silanyl)-ethylamine, 3-(methoxy-dimethyl-silanyl)-propylamine, 3-(dimethoxy-methyl-silanyl)-propylamine, 3-(trimethoxy-silanyl)-propylamine, (ethoxy-dimethyl-silanyl)-methylamine, (diethoxy-methyl-silanyl)-methylamine, (triethoxy-silanyl)-methylamine, 2-(ethoxy-dimethyl-silanyl)-ethylamine, 3-(diethoxy-methyl-silanyl)-ethylamine, 2-(triethoxy-silanyl)-ethylamine, 3-(ethoxy-dimethyl-silanyl)-propylamine, 3-(diethoxy-methyl-silanyl)-propylamine, 3-(triethoxy-silanyl)-propylamine, 3-(dipropoxy-methyl-silanyl)-propylamine, 3-(tripropoxy-silanyl)-propylamine, 3-(2-methyl-[1,3,2]dioxasilolan-2-yl)-propylamine, 3-(2-ethoxy-[1,3,2]dioxasilolan-2-yl)-propylamine, 3-(2-ethoxy-[1,3,2]dioxasilinan-2-yl)-propylamine, 3-(2-ethoxy-5-methyl-[1,3,2]dioxasilinan-2-yl)-propylamine, 3-[2-(3-amino-propyl)-5-methyl-[1,3,2]dioxasilinan-2-yloxy]-2-methyl-propan-1-ol, 3-(2-ethoxy-4,4,6-trimethyl-[1,3,2]dioxasilinan-2-yl)-propylamine, [3-(2-ethoxy-5-methyl-[1,3,2]dioxasilinan-2-yl)-2-methyl-propyl]-ethyl-amine, [3-(dimethoxy-methyl-silanyl)-2-methyl-propyl]-ethyl-amine, [3-(diethoxy-methyl-silanyl)-2-methyl-propyl]-ethyl-amine, [3-(diethoxy-methyl-silanyl)-propyl]-phenyl-amine, [3-(triethoxy-silanyl)-propyl]-phenyl-amine, N1-[3-(dimethoxy-methyl-silanyl)-propyl]-ethane-1,2-diamine, N1-[3-(trimethoxy-silanyl)-propyl]-ethane-1,2-diamine, N1-[3-(diethoxy-methyl-silanyl)-propyl]-ethane-1,2-diamine, N1-[3-(triethoxy-silanyl)-propyl]-ethane-1,2-diamine, N1-[3-(dipropoxy-methyl-silanyl)-propyl]-ethane-1,2-diamine, N1-[3-(tripropoxy-silanyl)-propyl]-ethane-1,2-diamine, N1-[3-(2-methyl-[1,3,2]dioxasilolan-2-yl)-propyl]-ethane-1,2-diamine, N1-[3-(2-ethoxy-[1,3,2]dioxasilolan-2-yl)-propyl]-ethane-1,2-diamine, N1-[3-(2-methyl-5-methyl-[1,3,2]dioxasilinan-2-yl)-propyl]-ethane-1,2-diamine, N1-[3-(2-ethoxy-5-methyl-[1,3,2]dioxasilinan-2-yl)-propyl]-ethane-1,2-diamine, and mixtures thereof.

Preferred amino-functional alkoxysilanes (b) include 3-(dimethoxy-methyl-silanyl)-propylamine, 3-(trimethoxy-silanyl)-propylamine, 3-(diethoxy-methyl-silanyl)-propylamine, 3-(triethoxy-silanyl)-propylamine, 3-(2-methyl-[1,3,2]dioxasilolan-2-yl)-propylamine, 3-(2-ethoxy-[1,3,2]dioxasilolan-2-yl)-propylamine, 3-(2-ethoxy-[1,3,2]dioxasilinan-2-yl)-propylamine, 3-(2-ethoxy-5-methyl-[1,3,2]dioxasilinan-2-yl)-propylamine, 3-[2-(3-amino-propyl)-5-methyl-[1,3,2]dioxasilinan-2-yloxy]-2-methyl-propan-1-ol, N1-[3-(dimethoxy-methyl-silanyl)-propyl]-ethane-1,2-diamine, N1-[3-(trimethoxy-silanyl)-propyl]-ethane-1,2-diamine, N1-[3-(diethoxy-methyl-silanyl)-propyl]-ethane-1,2-diamine, N1-[3-(triethoxy-silanyl)-propyl]-ethane-1,2-diamine, N1-[3-(2-ethoxy-[1,3,2]dioxasilolan-2-yl)-propyl]-ethane-1,2-diamine and N1-[3-(2-methyl-5-methyl-[1,3,2]dioxasilinan-2-yl)-propyl]-ethane-1,2-diamine.

In certain embodiments, the amino-functional alkoxysilane (b) is used at 0.1 to 1.9 equivalent(s) of N—H on the amino-functional alkoxysilane per equivalent of epoxy, $C_2O$, on the epoxy resin (c), preferably from 0.5 to 1.25 equivalent(s) of N—H on the amino-functional alkoxysilane per equivalent of epoxy, $C_2O$, on the epoxy resin (a) and more preferably from 0.95 to 1.05 equivalent(s) of N—H on the amino-functional alkoxysilane per equivalent of epoxy, $C_2O$, on the epoxy resin (a). In another embodiment, the amino-functional silane is present in the epoxy-based composition in an amount ranging from 1 to 30 percent by weight, more particularly from 2 to 25 percent by weight, or, in some cases, even more particularly from 5 to 18 percent by weight, with the weight percents being based on the total weight of components (a), (b), (c) and (d) of the epoxy-based composition.

Flexibilizer (c)

The flexibilizer (c) is a polysiloxane compound having the general Formula (I):

Formula (I)

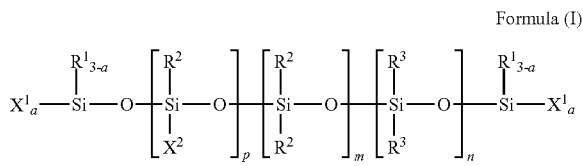

wherein:
each occurrence of $R^1$ is independently an alkyl group having from 1 to 6 carbon atoms, a phenyl group or an arenyl group having 7 to 12 carbon atoms;
each occurrence of $R^2$ is independently an alkyl group having from 1 to 6 carbon atoms; each occurrence of $R^3$ is independently a phenyl group or an arenyl group having 7 to 12 carbon atoms;
each $X^1$ is independently a hydroxyl group, an alkoxy group having from 1 to 6 carbon atoms, or an alkoxy group having from 1 to 6 carbon atoms and at least one ether or ester functional group;
each $X^2$ is independently a hydroxyl group, an alkoxy group having from 1 to 6 carbon atoms, an alkoxy group having from 1 to 6 carbon atoms and at least one ether or ester functional group, or a group with the Formula (II):

Formula (II)

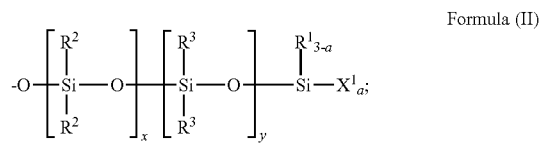

each occurrence of the subscripts a, m, n, p, x and y is independently an integer wherein a is 1 to 3; m is 0 to 500; n is 2 to 500, p is 0 to 10, x is 0 to 50; and y is 0 to 50, with the provisos that
(i) the molar ratio of m to n is from 0 to about 15, and
(ii) the molar ratio of p to n is from 0 to about 1.

The repeat units of general Formula (I) may be oriented in blocks or randomly, and is generally a mixture of components with the structure of Formula (I).

In one embodiment, the flexibilizer (c) has the structure of general Formula (I), wherein $X^1$ is hydroxyl, methoxy, ethoxy, propoxy or isopropoxy; $R^1$ is methyl or phenyl; $R^2$ is methyl; $R^3$ is phenyl; m is 1 to 100; n is 2 to 100; p is 0; and the molar ratio of m to n is from 1 to 10. Preferably, the $X^1$ is hydroxyl, methoxy or ethoxy; p is 0; and the molar ratio of m to n is 2 to 7.

In another embodiment, the flexibilizer (c) has a silanol content or a $SiX^1$ content of from 2 to 15 mole %, and preferably from 5 to 10 mole %, based upon the total number of silicon atoms and determined by $^{29}Si$ NMR spectroscopy. In still another embodiment, the flexibilizer (c) has a weight average molecular weight of from 500 to 50,000, preferably from 1,000 to 10,000, as determined in accordance with DIN Standard 55672 (1) using polystyrene standards.

The amount of flexibilizer (c) that is used in the epoxy-based compositions is from 0.08 moles to 2 moles of flexibilizer (c) per mole amino-functional alkoxysilane (b), preferably from 0.01 moles to 1.0 moles of flexibilizer (c) per mole of amino-functional alkoxysilane. In another embodiment, the flexibilizer (c) is present in the epoxy-based composition in an amount ranging from 15 to 70 percent by weight, more particularly from 20 to 60 percent by weight, or, in some cases, even more particularly from 30 to 50 percent by weight, with the weight percents being based on the total weight of components (a), (b), (c) and (d) of the epoxy-based composition.

Curing Catalyst (d)

The catalyst of the epoxy-based composition of the invention can be any curing catalyst (d) that is effective in promoting the reaction between the amino-functional alkoxysilane (b) and the flexibilizer (c) and moisture, when present, which occurs either in the absence or presence of moisture when $X^1$ is hydroxyl or upon exposure to moisture when $X^1$ is an alkoxy group having from 1 to 6 carbon atoms, or an alkoxy group having from 1 to 6 carbon atoms and at least one ether or ester functional group. The curing catalyst (d) is added to the epoxy-based composition to accelerate the curing rate of said compositions. Useful catalysts include Lewis acids and bases. Bases that are useful as catalysts include tertiary amines, such as for example, dimethyl benzyl amine, triethyl amine, pyridine, and the like. Organometallic compounds such as alkyl metal salts, metal chelates, or metal oxides in which the metal is tin, titanium, bismuth and zinc are useful as catalysts. Representative and non-limiting examples of catalysts include dibutyltin dilaurate, dibutyltin diacetate, dibutyltin diacetyldiacetonate, and organotitanates.

Advantageously, the catalyst is selected from the group consisting of organic tin, zirconium complex, aluminum chelate, titanic chelate, organic zinc, organic cobalt, organic iron, organic nickel and organobismuth, and mixtures thereof. The catalyst can be a mixture of organometallic catalyst and amine catalyst.

Representative examples of catalysts include, but are not limited to, dibutyltin oxide, dimethyltin diacetate, dimethyltin dilaurate, dimethyltin dineodecanote, dibutyltin dilaurate, dioctyltin dilaurate, dibutyltin diacetate, stannous octoate, stannous acetate, stannous oxide, morpholine, tri-isopropylamine, bis-(2-dimethylaminoethyl)ether and piperazine. Other useful catalysts include zirconium-contain, aluminum-containing and bismuth-contain complexes such as KAT XC6212, K-KAT 5218 and K-KAT 348, supplied by King Industries, Inc., titanium chelates such as the TYZOR® types, available from DuPont, the KR types, available from Kenrich Petrochemical, Inc., amines such as NIAX A-501 amine, available from Momentive Performance Materials Inc., and the like.

The curing catalyst may be present in the epoxy-based composition in an amount of from 0.05 weight percent to 10 weight percent based on the total weight of components (a), (b), (c) and (d), advantageously in an amount of from 0.1 weight percent to 5 weight percent based on the total weight of components (a), (b), (c) and (d) and most advantageously, in an amount of from 0.5 weight percent to 3 weight percent based on the total weight of components (a), (b), (c) and (d).

Other Optional Components

Other components useful in the epoxy-based composition of the invention are organic or inorganic compounds that contribute to the processing, flexibility, curing and/or cured properties of the epoxy-based composition of the invention. These components include solvents, polysiloxane resins, non-silicon-based epoxy hardeners, organic surfactants, colorants, plasticizers, extenders, fillers, organic resin modifiers, and various types of additives such as UV stabilizers, wetting agents, flow and leveling additives, thixotropes, defoamers and the like.

Solvents are used to lower the viscosity and improve the flow properties of the uncured epoxy-based composition, which are especially useful when the epoxy-based composition is used as a coating. A host of solvents may be mentioned as exemplary. For example, water, alcohols, glycols, triols, polyols, glycol ethers, esters, ketones, and hydrocarbon are exemplary.

Representative and non-limiting examples of specific solvents include water; mono-alcohols, such as methanol, ethanol, 1-propanol, 2-propanol (i-propanol), 2-methyl-1-propanol (i-butanol), 2-methyl-2-propanol (tert-butanol), 1-butanol, 2-butanol, 2-methyl-1-butanol, 2-methyl-2-butanol, 2,2-dimethyl-1-propanol, 1-pentanol, 2-pentanol, 4-methyl-2-pentanol; glycols such are propylene glycol, 1,3-butanediol, 1,4-butane diol, 2-methyl-1,3-propanediol, 2-methyl-2,4-pentanediol (hexylene glycol), diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate-co-propoxylate triol, glycerol propoxylate, pentaerythritol; glycol ethers such as 1-methoxy-2-propanol (propylene glycol methyl ether), 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxy)ethanol, 2-(2-ethoxyethoxy)ethanol, 2-(2-propoxyethoxy)ethanol, 2-(2-butoxyethoxy)ethanol (butyl carbitol), di(propylene glycol) butyl ether, tri(ethylene glycol) monomethyl ether, tri(ethylene glycol) monoethyl ether, tri(ethylene glycol) monobutyl ether, poly(ethylene glycol) methyl ether, poly (ethylene glycol) dimethylether, poly(ethylene glycol-co-propylene glycol), poly(ethylene glycol-co-propylene glycol) monobutyl ether, poly(propylene glycol) monobutyl ether, di(propylene glycol) dimethylether; esters including methyl acetate, ethyl acetate, ethyl lactate, 2-methoxyethyl acetate, 2-ethoxyethyl acetate, 2-butoxyethyl acetate, 2-(2-methoxyethoxy)ethyl acetate, 2-(2-ethoxyethoxy)ethyl acetate, 2-(2-butoxyethoxy)ethyl acetate, glycol diacetate, triethylene glycol diacetate, propylene glycol methyl ether acetate (1-methoxy-2-propanol acetate), propylene glycol ethyl ether acetate, ketones including acetone, methyl ethyl ketone, 2,4-pentane dione, diacetone alcohol and hydrocarbons including toluene, xylene, naptha, mineral spirits, hexane, heptane, cyclohexane and mixtures thereof.

In certain embodiments, the solvent is present in the epoxy-based composition of the present invention in an amount ranging from 1 to 80 percent by weight, such as 10 to 30 percent by weight, or, in some cases, 10 to 25 percent by weight, with the weight percents being based on the total weight of components (a), (b), (c), (d) and the solvent.

Polysiloxane resins are useful in providing hardness, weatherability and gloss to the epoxy-based compositions of the invention. Suitable polysiloxane resins have the general Formula (VI):

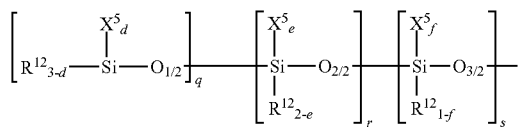

Formula (VI)

wherein:
each occurrence of $R^{12}$ is monovalent hydrocarbon selected from the group consisting of a straight chain alkyl, branched chain alkyl, and cyclo alkyl groups having 1 to 10 carbon atoms, phenyl, and arenyl group containing from 7 to 10 carbon atoms;

each occurrence of $X^5$ is a hydrolysable group $-OR^{12}$; and
each occurrence of the subscripts d, e, f, q, r and s is independently an integer wherein d is 0 to 3, e is 0 to 2, f is 0 or 1; q is 0 to 25; r is 0 to 100; and s is 0 to 100, with the provisos that (i) $4 \leq q+r+s \leq 125$;

(ii) the quotient $(dq+er+fs)/(3q+2r+s)$ is from 0.05 to 0.6; and (iii) all the half oxygen atoms, $O_{1/2}$, in a repeat unit are matched with another half oxygen atom in a different repeat unit to form a full oxygen atom, $-O-$, which covalently links two repeat units together.

In certain embodiments, q, r, and s are selected in such a way that the polysiloxane resin has a weight average molecular weight in the range of from 400 to 10,000, such as from 500 to 2,500, as determined in accordance with DIN Standard 55672 (1) using polystyrene standards.

The polysiloxane resins that are suitable for use as component (a) in the composition of the invention are commercially available and include, for example, TSR165, from Momentive Performance Materials Inc., DC-3074, DC-3037, DC-840, Z6018, Q1-2530 and 6-2230 from Dow Corning, and GE SR 191, SY-550, and SY-231 commercially available from Wacker Silicones.

In certain embodiments, the polysiloxane resin is present in the composition in an amount ranging from 1 to 50 percent by weight, such as 10 to 30 percent by weight, or, in some cases, 10 to 25 percent by weight, with the weight percents being based on the total weight of components (a), (b), (c), (d) and polysiloxane resin of the epoxy-based composition.

Non-silicon based hardeners are organic compounds that contain functional groups that are reactive with the epoxy resins (a). These hardeners react with the epoxy resin (a) to crosslink the resin. Hardners include for, example, aliphatic or aromatic primary amines or secondary amines, aliphatic or aromatic primary polyamines or secondary polyamines, polyamides, amidoamines, ketimines, aldimines, mercaptans, isocyanates, melamine formaldehyde resins, urea formaldehyde resins, phenol formaldehyde resins, carboxylic acids and carboxylic acid anhydrides.

Representative and non-limiting examples of non-silicon based hardeners include dicyandiamide, ethylene diamine, diethylene triamine, triethylene tetraamine, tetraethylene pentamine, benzene-1,4-diamine, m-phenylenediamine, poly (oxypropylene diamine), poly(oxypropylene triamine), poly (glycol amine), 1,2-diaminocyclohexane, 4,4'-diaminodiphenyl sulfone, 4,4'-diaminodiphenyl methane, dihydrolxyethyl diethylene triamine, N, aminoethylpiperazine, isophorone diamine, 1,2-diaminocyclohexane, the reaction product of tall-oil fatty acid with diethylene triamine, phthalic anhydride, tetrahydrophthalic anhydride, methyltetrahydrophthalic anhydride, hexahydrophthalic anhydride, nadic methyl anhydride, chloroendic anhydride, isophorone diisocyanate, and the like.

In certain embodiments, the non-silicon based hardener is used at 0.1 to 1.9 equivalent(s) of N—H on the polyamine hardener per equivalent of epoxy, $C_2O$, on the epoxy resin (c), preferably from 0.5 to 1.25 equivalent(s) of N—H on polyamine hardener per equivalent of epoxy, $C_2O$, on the epoxy resin (a) and more preferably from 0.95 to 1.05 equivalent(s) of N—H on the polyamine hardener per equivalent of epoxy, $C_2O$, on the epoxy resin (a). In another embodiment, hardener is present in the epoxy-based composition in an amount ranging from 1 to 30 percent by weight, more particularly from 2 to 25 percent by weight, or, in some cases, even more particularly from 5 to 18 percent by weight, with the weight percents being based on the total weight of components (a), (b), (c) and (d) of the epoxy-based composition.

Organic surfactants may be used to aid in the wetting and leveling of the epoxy-based composition of the invention, especially when the said composition is used as a coating. The organic surfactants include nonionic, cationic, anionic, amphoteric, zwitterionic, polymeric surfactants, or any mixture thereof. The organic surfactants are typically hydrocarbon based, silicone based or fluorocarbon based. Organic surfactants that have short chain hydrophobes are useful and are described in U.S. Pat. No. 5,558,806, incorporated by reference herein. Other useful organic surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates. and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and mixtures thereof.

Representative, non-limiting examples of organic surfactants include alkyl acetylenic diols sold by Air Products under the trade name SURFONYL, pyrrilodone-based surfactants sold by ISP under the trade name SURFADONE-LP 100, 2-ethyl hexyl sulfate, isodecyl alcohol ethoxylates sold by Rhodia under the trade name RHODASURF DA 530, ethylene diamine alkoxylates sold by BASF under the trade name TETRONICS, ethylene oxide/propylene oxide copolymers sold by BASF under the trade name PLURONICS, and diphenyl ether Gemini type surfactants sold by Dow Chemical Corporation under the trade name DOWFAX.

The compositions described herein can contain organic surfactant in an amount of specifically from 0.01 to 5 weight percent, more specifically of from 0.05 to 2 weight percent and most specifically of from 0.1 to 1 weight percent, said weight percents being based upon the total weight of components (a), (b), (c) and (d) of the epoxy-based composition.

The epoxy-based composition of the invention may include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coating compositions by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

In general, the colorant can be present in any amount sufficient to impart the desired visual and/or color effect. The colorant may comprise from, for example, 1 to 65 weight percent of the present compositions, such as from 3 to 40 weight percent or 5 to 35 weight percent, with weight percent based on the total weight of components (a), (b), (c) and (d) of the epoxy-based compositions.

The epoxy-based composition of the invention may include a filler. The filler of the epoxy-based composition can be any inorganic or organic filler used to reinforce or extend the composition of the present invention. Typical fillers include, for example, reinforcing fillers such as carbon black, fumed silica, precipitated silica, clays, talc, aluminum silicates, metal oxides and hydroxides, and extending fillers such as treated and untreated calcium carbonates and the like. Fillers can be in the form of particulates, aggregates, agglomerates, platelets, and fibers. In one embodiment, one or more fillers are combined with silane coupling agents.

The fillers may be present in the moisture-curable resin composition in an amount of from 1 weight percent to 80 weight percent based on the total weight of components (a), (b), (c) (d) and filler, advantageously in an amount of from 10 weight percent to 60 weight percent based on the total weight of components (a), (b), (c), (d) and filler, and most advantageously, in an amount of from 20 weight percent to 50 weight percent based on the total weight of components (a), (b), (c), (d) and filler.

In the two-component epoxy-based composition of the invention, the epoxy resin (a) and flexibilizer (c) is added to a first component and the amino-functional alkoxysilane and non-silicon based hardeners, if present, are added to the second component, thereby forming storage-stable first and second components. When the two components are mixed together, the curing reaction is initiated. Cure may occur at room temperature or at elevated temperatures. Heating the mixture to a temperature of from 50° C. to 200° C. accelerates the cure. The curing catalyst (d) and other optional components (additives) may be included in either of the two components.

As will be appreciated from the foregoing disclosure, the epoxy-based compositions of the invention can be prepared by combining: (a) an epoxy resin; (b) an amino-functional alkoxysilane; (c) a flexibilizer and (d) a curing agent, as well as one or more of the previously described optional components, among others. The combination can be achieved by the use of static mixers or mechanical mixers.

When used as a coating, the epoxy-based compositions of this invention can be applied to a desired substrate surface to protect it from weathering, impact, and exposure to corrosion and/or chemicals. Illustrative of substrates that can be treated using compositions of this invention include wood, plastic, concrete, vitreous surfaces, and metallic surfaces. The coating compositions of this invention are useful, for example, as a top coating disposed either directly onto the substrate surface itself or disposed onto a prior or other underlying coating, as for example, an inorganic or organic primer material, disposed on the substrate surface to achieve a desired purpose.

The coating compositions of this invention can be applied to a surface to be treated by conventional coating techniques such as, for example, dip coating, direct roll coating, reverse roll coating, curtain coating, spray coating, brush coating, and combinations thereof.

In another embodiment of the invention, there is provided a substrate at least partially coated with the coating compositions of the invention. Upon cure, the formed coating provides protection to the surface of the underlying substrate, and exhibits a superior performance on flexibility as compared to the coatings formed from coating compositions that do not contain such a flexibilizer.

Other than in the working examples or where other indicated, all numbers expressing amounts of materials, reaction conditions, time durations, quantified properties of materials, and so forth, stated in the specification and claims are to be understood as being modified in all instances by the term, "about".

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representative of the group and all combinations thereof.

The following examples are intended to illustrate, but in no way limit the scope of the present invention. All parts and percentages are by weight and all temperatures are in degrees Celsius unless explicitly stated otherwise.

EXAMPLES

Example 1

The samples were formulated to a total weight of 35.0 grams.

Part A. Into a 50 mL plastic beaker were charged 2-{4-[1-methyl-1-(4-oxiranylmethoxy-cyclohexyl)-ethyl]-cyclohexyloxymethyl}-oxirane (16.72 grams of Eponex 1510 Resin, available from Momentive Specialty Chemicals), dibutyltin dilaurate, (0.66 grams of Fomrez Catalyst SUL-4, available from Momentive Performance Materials). A Siloxane Resin C (4.87 grams, available from Momentive Performance Materials) is added to this mixture, followed by Flexibilizer A (1.62 gram, available from Momentive Performance Materials), N-butyl acetate (0.84 grams, available through Aldrich) and methyl ethyl ketone (1.67 grams, available through Aldrich). The Siloxane Resin D was a partial hydrolyzate and condensate of dimethyldimethoxysilane (33 mole %), diphenyldimethoxysilane (34 mole %), phenyltrimethoxysilane (33 mole %), where the residual methoxy content is 15 mole %. Flexibilizer A was hydrolyzate and condensate of dimethyldichlorosilane and diphenyldichorosilane, where the molar ratio of dimethyldichlorosilane to diphenyldichlorosilane is 4.56 to 1, and the silanol content, determined by $^{29}Si$ NMR was 8.5 mole %. The number average molecular weight, calculated from end-group analysis, was 2,200 grams per mole of Flexibilizer A.

Part B. 3-(Triethoxy-silanyl)-propylamine (8.61 grams of Silquest* A-1100 silane, available from Momentive Performance Materials).

Part A was then mixed with Part B thoroughly with a conventional metal stirrer blade for approximately 1 minute to provide a low viscosity, uniform blend of the liquid coating for spray application.

Cleaning of Cold Roll Steel Panels

The substrates used for testing were Cold Roll Steel APR10184 panels available from ACT Test Panels. A cleaning was prepared be mixing Triton X-100 (0.06 weight percent, available from Aldrich), sodium metasilicate (anhydrous, 0.52 weight percent, available from Aldrich), sodium carbonate (anhydrous, 0.49 weight percent, available from Aldrich), sodium phosphate, dibasic (anhydrous, 0.35 weight percent, available from Aldrich) and de-ionized water (98.57 weight percent). The clean solution was heated to a temperature of from 65° C. to 70° C. The Cold Roll Steel panels were immersed heated and stirred cleaning solution for 2 to 3 minutes to remove any oil contaminants. The panels are then removed from the solution and immediately rinsed with de-ionized water. Kimwipe Kimtech Delicate Task Wipers, available from Kimberly Clark, were used to wipe the panels dry. The panels were then lightly sprayed with water to determine the water break of the cleaned panels. If the panels showed water beading, then the cleaning process was repeated. If the water formed a continuous sheen, then the panels were then dried with a Kimwipe wiper and stored for use.

Spray Application.

The coating was then spray applied over seven 2-inch by 4-inch (5.08-centimeter by 10.16-centimeter) cut treated and cleaned bare Cold Roll Steel panels, purchased ACT. Spray application was conducted with a Starting Line High Volume Low Pressure gravity fed siphon spray hand held spraygun, available through DeVilbiss. The coatings were sprayed at a gauge pressure near the gun of 30 lb/in$^2$ (206.8 kilopascal). The spray application technique was a side-to-side sweep of the spray onto the panel at a rate of approximately 1,000 inch per minute (25.4 meters per minute), indexing up and down the panels at approximately 2 inches (5.08 centimeters) per sweep. One entire pass along the entire panel set would encompass approximately 5 to 6 sweeps.

The entire set of panels (seven panels) was sprayed between 5 and 6 passes. Two coated panels were removed and air-dried for 24 hours at room temperature. One panel was cured in an oven for 60 hours at 80° C. and the second panel was cured in an oven for one week at 80° C. The film thickness of the dried and cured coatings was between 2.0 mils to 3.5 mils (0.0508 millimeters to 0.0889 millimeters). These coated panels were designated as Low DFT (Dried Film Thickness). The remaining five coated panels were sprayed before drying with another 5 to 6 passes and two recoated panels were removed and air-dried for 24 hours at room temperature. One panel was cured in an oven for 60 hours at 80° C. and the second panel was cured in an oven for one week at 80° C. The film thickness of the dried and cured coatings was between 3.5 mils to 5.5 mils (0.0889 millimeters to 0.1397 millimeters). These recoated panels were designated as Medium DFT. A third re-coated panel was removed and air-dried for 16 days at room temperature. This panel was used for harness and gloss testing and had a film thickness of between 3.5 mils to 5.5 mils (0.0889 millimeters to 0.1397 millimeters). The two remaining recoated panels were sprayed with another 5 to 6 passes and were removed and air-dried for 24 hours. One panel was cured in an oven for 60 hours at 80° C. and the second panel was cured in an oven for one week at 80° C. The film thickness of the dried and cured coatings was between 5.5 mils to 9.5 mils (0.1397 millimeters to 0.2412 millimeters). These recoated panels were designated as High DFT.

Flexibility Testing.

The coated panels were then segregated into two sets. The first set was composed of coated panels from the low, mid-range, and high dry film thickness set that was air-dried and cured for 60 hours at 80° C. The second set was composed of panels from the low, mid-range, and high dry film thickness set that was air-dried and cured for 1 week at 80° C. Coated panels were allowed to cool to room temperature before being subjected to Conical Mandrel bending.

Mandrel Bending was performed in accordance with ASTM-D522 at approximately the 1-inch (2.54 centimeter) diameter bend section of the instrument. The data are presented in Table 1. The panels were rated either as a PASS, where the samples showed no evidence of cracking after bending, MARGINAL, where the panels showed, at most, one thin crack line around the bend area, or a FAIL, where the panel showed evidence of multiple cracks and/or delamination.

Gloss Measurement.

Gloss measurements were carried out in accordance with ASTM D523 on coated panes that were air-dried for 16 days at room temperature and had a film thickness of between 3.5 mils to 5.5 mils (0.0889 millimeters to 0.1397 millimeters). Gloss was measured using a Byk-Gardner Glossmeter.

Examples, which had low gloss values, were observed as having film incompatibility, while gloss values, which were high, were observed as having film clarity and good resin compatibility. The data are presented in Table 1.

Hardness Testing.

Konig Pendulum Hardness measurements were carried out in accordance with ASTM D4366 on coated panes that were air-dried for 16 days at room temperature and had a film thickness of between 3.5 mils to 5.5 mils (0.0889 millimeters to 0.1397 millimeters).

The harder the surface of the film, the higher the number of pendulum swings, and the higher the number of swing counts. The softer and/or incompatible a film was, the lower the number of swing counts (cycles).

Examples 2-15 and Comparative Examples A-G

Examples 2-15 and comparative Examples A-G were prepared using the procedure of Example 1. The components, the amounts of each component and test results are presented in Table 1.

TABLE 1

Formulation for epoxy-based coating and coating evaluation results.

| | Comp. Ex. A | Comp. Ex. B | Ex. 1 | Ex. 2 | Ex. 3 |
|---|---|---|---|---|---|
| Component, Part A | | | | | |
| Epoxy resin (a), grams[1] | 15.99 | 16.72 | 16.72 | 16.72 | 16.72 |
| Catalyst (d), grams[2] | 0.65 | 0.66 | 0.66 | 0.66 | 0.66 |
| Siloxane Resin D | 6.52 | 6.50 | 4.87 | 3.25 | 0.00 |
| Flexibilzer A (c) | 0.00 | 0.00 | 1.62 | 3.25 | 6.50 |
| Hydroxy-terminated dimethyl silicone[3] | 0.00 | 0.00 | 0.00 | 0.00 | 0.00 |
| N-Butyl Acetate | 0.80 | 0.84 | 0.84 | 0.84 | 0.84 |
| Methyl ethyl ketone | 1.60 | 1.67 | 1.67 | 1.67 | 1.67 |
| Weight Part A, grams | 25.56 | 26.39 | 26.39 | 26.39 | 26.39 |
| N—H/C$_2$O Ratio | 1.00 | 1.00 | 1.00 | 1.00 | 1.00 |
| Component, Part B | | | | | |
| Amino-functional alkoxysilane, grams[4] | 0.00 | 8.61 | 8.61 | 8.61 | 8.61 |
| EpiKure 3125, grains[5] | 9.44 | 0.00 | 0.00 | 0.00 | 0.00 |
| Weight Part B, grams | 9.44 | 8.61 | 8.61 | 8.61 | 8.61 |
| Flexibility, 60 hrs at 80° C. | | | | | |
| LOW DFT | FAIL | FAIL | FAIL | FAIL | FAIL |
| MIDDLE DFT | FAIL | FAIL | FAIL | FAIL | FAIL |
| HIGH DFT | FAIL | FAIL | FAIL | FAIL | FAIL |
| Flexibility, 1 week at 80° C. | | | | | |
| LOW DFT | FAIL | FAIL | FAIL | FAIL | FAIL |
| MIDDLE DFT | FAIL | FAIL | FAIL | FAIL | FAIL |
| HIGH DFT | FAIL | FAIL | FAIL | FAIL | FAIL |
| Konig Hardness, cycles | 93 | 236 | 211 | 224 | 125 |
| Gloss | | | | | |
| 20° | 1.2 | 101.0 | 75.8 | 14.5 | 1.9 |
| 60° | 3.0 | 117.0 | 96.2 | 49.7 | 4.3 |
| 85° | 0.7 | 95.6 | 95.2 | 91.0 | 4.6 |

TABLE 1-continued

Formulation for epoxy-based coating and coating evaluation results.

|  | Comp. Ex. C | Ex. 4 | Ex. 5 | Ex. 6 |
|---|---|---|---|---|
| Component, Part A | | | | |
| Epoxy resin (a), grams[1] | 14.72 | 14.72 | 14.72 | 14.72 |
| Catalyst (d), grams[2] | 0.66 | 0.66 | 0.66 | 0.66 |
| Siloxane Resin D | 9.84 | 7.38 | 4.92 | 0.00 |
| Flexibilzer A (c) | 0.00 | 2.46 | 4.92 | 9.84 |
| Hydroxy-terminated dimethyl silicone[3] | 0.00 | 0.00 | 0.00 | 0.00 |
| N-Butyl Acetate | 0.74 | 0.74 | 0.74 | 0.74 |
| Methyl ethyl ketone | 1.47 | 1.47 | 1.47 | 1.47 |
| Weight Part A, grams | 27.42 | 27.42 | 27.42 | 27.42 |
| N—H/C$_2$O Ratio | 1.00 | 1.00 | 1.00 | 1.00 |
| Component, Part B | | | | |
| Amino-functional alkoxysilane, grams[4] | 7.58 | 7.58 | 7.58 | 7.58 |
| EpiKure 3125, grams[5] | 0.00 | 0.00 | 0.00 | 0.00 |
| Weight Part B, grams | 7.58 | 7.58 | 7.58 | 7.58 |
| Flexibility, 60 hrs at 80° C. | | | | |
| LOW DFT | FAIL | FAIL | FAIL | FAIL |
| MIDDLE DFT | FAIL | FAIL | FAIL | FAIL |
| HIGH DFT | FAIL | FAIL | FAIL | FAIL |
| Flexibility, 1 week at 80° C. | | | | |
| LOW DFT | FAIL | FAIL | FAIL | FAIL |
| MIDDLE DFT | FAIL | FAIL | FAIL | FAIL |
| HIGH DFT | FAIL | FAIL | FAIL | FAIL |
| Konig Hardness, cycles | 204 | 191 | 214 | 78 |
| Gloss | | | | |
| 20° | 109.0 | 86.9 | 104.0 | 7.8 |
| 60° | 119.0 | 103.0 | 116.0 | 18.7 |
| 85° | 98.3 | 96.0 | 98.4 | 20.9 |

|  | Comp. Ex. D | Ex. 7 | Ex. 8 | Ex. 9 |
|---|---|---|---|---|
| Component, Part A | | | | |
| Epoxy resin (a), grams[1] | 12.67 | 12.67 | 12.67 | 12.67 |
| Catalyst (d), grams[2] | 0.66 | 0.66 | 0.66 | 0.66 |
| Siloxane Resin D | 13.24 | 9.93 | 6.62 | 0.00 |
| Flexibilzer A (c) | 0.00 | 3.31 | 6.62 | 13.24 |
| Hydroxy-terminated dimethyl silicone[3] | 0.00 | 0.00 | 0.00 | 0.00 |
| N-Butyl Acetate | 0.63 | 0.63 | 0.63 | 0.63 |
| Methyl ethyl ketone | 1.27 | 1.27 | 1.27 | 1.27 |
| Weight Part A, grams | 28.48 | 28.48 | 28.48 | 28.48 |
| N—H/C$_2$O Ratio | 1.00 | 1.00 | 1.00 | 1.00 |
| Component, Part B | | | | |
| Amino-functional alkoxysilane, grams[4] | 6.52 | 6.52 | 6.52 | 6.52 |
| EpiKure 3125, grams[5] | 0.00 | 0.00 | 0.00 | 0.00 |
| Weight Part B, grams | 6.52 | 6.52 | 6.52 | 6.52 |
| Flexibility, 60 hrs at 80° C. | | | | |
| LOW DFT | FAIL | FAIL | MARGINAL | PASS |
| MIDDLE DFT | FAIL | FAIL | FAIL | PASS |
| HIGH DFT | FAIL | FAIL | FAIL | PASS |
| Flexibility, 1 week at 80° C. | | | | |
| LOW DFT | FAIL | FAIL | MARGINAL | PASS |
| MIDDLE DFT | FAIL | FAIL | FAIL | PASS |
| HIGH DFT | FAIL | FAIL | FAIL | PASS |
| Konig Hardness, cycles | 216 | 204 | 189 | 103 |

TABLE 1-continued

Formulation for epoxy-based coating and coating evaluation results.

| Gloss | | | | |
|---|---|---|---|---|
| 20° | 106.0 | 109.0 | 111.0 | 106.0 |
| 60° | 119.0 | 119.0 | 121.0 | 117.0 |
| 85° | 97.9 | 97.4 | 98.8 | 98.0 |

| | Comp. Ex. E | Ex. 10 | Ex. 11 | Ex. 12 |
|---|---|---|---|---|
| Component, Part A | | | | |
| Epoxy resin (a), grams[1] | 10.59 | 10.59 | 10.59 | 10.59 |
| Catalyst (d), grams[2] | 0.66 | 0.66 | 0.66 | 0.66 |
| Siloxane Resin D | 16.71 | 12.53 | 8.35 | 0.00 |
| Flexibilzer A (c) | 0.00 | 4.18 | 8.35 | 16.71 |
| Hydroxy-terminated dimethyl silicone[3] | 0.00 | 0.00 | 0.00 | 0.00 |
| N-Butyl Acetate | 0.53 | 0.53 | 0.53 | 0.53 |
| Methyl ethyl ketone | 1.06 | 1.06 | 1.06 | 1.06 |
| Weight Part A, grams | 29.55 | 29.55 | 29.55 | 29.55 |
| N—H/C$_2$O Ratio | 1.00 | 1.00 | 1.00 | 1.00 |
| Component, Part B | | | | |
| Amino-functional alkoxysilane, grams[4] | 5.45 | 5.45 | 5.45 | 5.45 |
| EpiKure 3125, grams[5] | 0.00 | 0.00 | 0.00 | 0.00 |
| Weight Part B, grams | 5.45 | 5.45 | 5.45 | 5.45 |
| Flexibility, 60 hrs at 80° C. | | | | |
| LOW DFT | PASS | PASS | PASS | PASS |
| MIDDLE DFT | FAIL | MARGINAL | PASS | PASS |
| HIGH DFT | FAIL | MARGINAL | PASS | PASS |
| Flexibility, 1 week at 80° C. | | | | |
| LOW DFT | FAIL | MARGINAL | PASS | PASS |
| MIDDLE DFT | FAIL | MARGINAL | PASS | PASS |
| HIGH DFT | FAIL | MARGINAL | MARGINAL | PASS |
| Konig Hardness, cycles | 196 | 170 | 141 | 57 |
| Gloss | | | | |
| 20° | 114.0 | 110.0 | 109.0 | 104.0 |
| 60° | 121.0 | 118.0 | 119.0 | 115.0 |
| 85° | 96.7 | 98.4 | 97.0 | 95.0 |

| | Comp. Ex. F | Ex. 13 | Ex. 14 | Ex. 15 | Comp. Ex. G |
|---|---|---|---|---|---|
| Component, Part A | | | | | |
| Epoxy resin (a), grams[1] | 8.46 | 8.46 | 8.46 | 8.46 | 16.72 |
| Catalyst (d), grams[2] | 0.67 | 0.67 | 0.67 | 0.67 | 0.66 |
| Siloxane Resin D | 20.24 | 15.18 | 10.12 | 0.00 | 0.00 |
| Flexibilzer A (c) | 0.00 | 5.06 | 10.12 | 20.24 | 0.00 |
| Hydroxy-terminated dimethyl silicone[3] | 0.00 | 0.00 | 0.00 | 0.00 | 6.50 |
| N-Butyl Acetate | 0.42 | 0.42 | 0.42 | 0.42 | 0.84 |
| Methyl ethyl ketone | 0.85 | 0.85 | 0.85 | 0.85 | 1.67 |
| Weight Part A, grams | 30.64 | 30.64 | 30.64 | 30.64 | 26.39 |
| N—H/C$_2$O Ratio | 1.00 | 1.00 | 1.00 | 1.00 | 1.00 |
| Component, Part B | -39A | -39G | -39E | -39C | -37J |
| Amino-functional alkoxysilane, grams[4] | 4.36 | 4.36 | 4.36 | 4.36 | 8.61 |
| EpiKure 3125, grams[5] | 0.00 | 0.00 | 0.00 | 0.00 | 0.00 |
| Weight Part B, grams | 4.36 | 4.36 | 4.36 | 4.36 | 8.61 |
| Flexibility, 60 hrs at 80° C. | | | | | |
| LOW DFT | FAIL | PASS | PASS | PASS | FAIL |
| MIDDLE DFT | FAIL | PASS | PASS | PASS | FAIL |
| HIGH DFT | FAIL | PASS | PASS | PASS | FAIL |
| Flexibility, 1 week at 80° C. | | | | | |
| LOW DFT | FAIL | PASS | PASS | PASS | FAIL |
| MIDDLE DFT | FAIL | PASS | PASS | PASS | FAIL |

TABLE 1-continued

Formulation for epoxy-based coating and coating evaluation results.

| HIGH DFT | FAIL | MARGINAL | PASS | PASS | FAIL |
|---|---|---|---|---|---|
| Konig Hardness, cycles | 198 | 119 | 111 | 43 | 61 |
| Gloss | | | | | |
| 20° | 117.0 | 110.0 | 108.0 | 102.0 | 2.5 |
| 60° | 123.0 | 120.0 | 118.0 | 115.0 | 5.7 |
| 85° | 97.1 | 98.0 | 98.0 | 92.2 | 1.7 |

[1] 2-{4-[1-methyl-1-(4-oxiranylmethoxy-cyclohexyl)-ethyl]-cyclohexyloxymethyl}-oxirane
[2] Dibutyl tin dilaurate
[3] Hydroxy-terminated dimethyl silicone with 7.2 mole weight percent hydroxyl and a number average molecular weight of 485 grams/mole determined from $^{29}$Si-NMR end-group analysis).
[4] 3-(Triethoxy-silanyl)-propylamine
[5] Reaction product of C18 unsaturated fatty acid dimers with polyamines, amine value of 330-336 mg/g as determined by ASTM D2896.

The results in Table 1 indicate that cured epoxy-based composition that does not contain the amino-functional alkoxysilane (b) and flexibilizer (c), such as Comparative Example A, had low gloss and poor flexibility and was soft. Similar compositions containing amino-functional alkoxysilane (b) and flexibilizer (c), such as Example 9, had gloss at 60° of 117, Konig hardness of 103 and was flexible even after heating for 1 week at 80° C. at several film thicknesses. Cured epoxy-based compositions containing a hydroxyl-terminated dimethyl silicone and amino-functional alkoxysilane (b), but no flexibilizer (c), such as Comparative Example G, had a low Konig hardness of 61, low gloss at 60° of 5.7 and failed the flexibility test. Although the hydroxyl-terminated dimethyl silicone has reactive silanol groups, it does not contain the diphenylsiloxy repeat units of the flexibilizer (c) of the present invention, and was therefore unable to increase the flexibility of the cured epoxy-based composition. Cured epoxy-based compositions containing a Siloxane Resin D and an amino-functional alkoxysilane (b), such as Comparative Example E, had good Konig hardness of 196, but poor flexibility after one week at 80° C. Similar cured epoxy-based composition in which some of the Siloxane Resin D was replaced with Flexibilizer A, such as Example 11, has a decrease in Konig hardness, but was flexible after one week at 80° C.

Examples 16-18 and Comparative Example H

Preparation of Coating

To a 100 ml plastic beaker were charged formulated epoxy resin coating, Part A, (47.29 grams of PSX700, PX7003/01 White Resin, available from PPG Industries, Inc.), curative, Part B, (7.71 grams of PSX700 Cure, available from PPG Industries, Inc.) and solvent (5 grams of PPG Amercoat 65 Thinner, available from PPG Industries, Inc.). The mixture was stirred with a conventional metal stirrer blade for approximately 1 minute to provide a low viscosity, uniform blend of the liquid coating for spray application.

Cleaning of Cold Roll Steel Substrates

The substrate used for testing was Cold Roll Steel APR10184 substrate available from ACT Test Panels. A cleaning was prepared be mixing Triton X-100 (0.06 weight percent, available from Aldrich), sodium metasilicate (anhydrous, 0.52 weight percent, available from Aldrich), sodium carbonate (anhydrous, 0.49 weight percent, available from Aldrich), sodium phosphate, dibasic (anhydrous, 0.35 weight percent, available from Aldrich) and de-ionized water (98.57 weight percent). The clean solution was heated to a temperature of 65° C. to 70° C. The Cold Roll Steel panels were immersed heated and stirred cleaning solution for 2 to 3 minutes to remove any oil contaminants. The panels are then removed from the solution and immediately rinsed with de-ionized water. Kimwipe Kimtech Delicate Task Wipers, available from Kimberly Clark, were used to wipe the panels dry. The panels were then lightly sprayed with water to determine the water break of the cleaned panels. If the panels showed water beading, then the cleaning process was repeated. If the water formed a continuous sheen, then the panels were then dried with a Kimwipe wiper and stored for use.

Spray Application

The coating was then spray applied over seven 2-inch by 4-inch (5.08-centimeter by 10.16-centimeter) cut treated and cleaned bare Cold Roll Steel panels, purchased ACT. Spray application was conducted with a Starting Line High Volume Low Pressure gravity fed siphon spray hand held spraygun, available through DeVilbiss. The coatings were sprayed at a gauge pressure near the gun of 35 lb/in$^2$ (241.2 kilopascal). The spray application technique was a side-to-side sweep of the spray onto the panel at a rate of approximately 1,000 inch per minute (25.4 meters per minute), indexing up and down the panels at approximately 2 inches (5.08 centimeters) per sweep until approximately 6 to 7 mils (0.1524 millimeter to 0.1778 millimeter) of coating thickness was applied on the panel, as determine by Gardner wet film build gauge.

Color, Gloss and Flexibility Testing

The panels were air-dried for 24 hours under room temperature conditions. The panels were placed in QUV-B running only on continuous UV irradiation. Gloss, using ASTM D523, and CIE L*a*b Color, daylight at 65° angle (D65), using a Chroma Meter CR-400 (Available from Konica-Minolta) were measured initially on all example test panels and at various time intervals up to three weeks in QUV-B. Two panels were placed in an oven set at 80° C. One panel was removed after 60 hours while the other panel was removed after 1 week. After each panel was removed, they were allowed to cool down to room temperature before being subjected to Conical Mandrel bending. Mandrel Bending was performed at approximately the 1-inch diameter bend section of the instrument.

Example 16

To a 100 ml plastic beaker were charged formulated epoxy resin coating, Part A, (43.66 grams of PSX700, PX7003/01 White Resin, available from PPG Industries, Inc.), Flexibilizer A (4.22 grams, available from Momentive), curative, Part B, (7.12 grams of PSX700 Cure, available from PPG Industries, Inc.) and solvent (5 grams of PPG Amercoat 65 Thinner, available from PPG Industries, Inc.). The mixture was stirred with a conventional metal stirrer blade for approximately 1 minute to provide a low viscosity, uniform blend of the liquid coating for spray application. The coating was tested as described in Comparative Example H.

Example 17

To a 100 ml plastic beaker were charged formulated epoxy resin coating, Part A, (39.23 grams of PSX700, PX7003/01 White Resin, available from PPG Industries, Inc.), Flexibilizer A (4.68 grams, available from Momentive), hydroxyl-terminated polydimethylsilicone having 7.2 mole weight percent hydroxyl (number average molecular weight, Mn, of 485 grams/mole determined from 29Si-NMR end-group analysis), curative, Part B, (6.40 grams of PSX700 Cure, available from PPG Industries, Inc.) and solvent (5 grams of PPG Amercoat 65 Thinner, available from PPG Industries, Inc.). The mixture was stirred with a conventional metal stirrer blade for approximately 1 minute to provide a low viscosity, uniform blend of the liquid coating for spray application. The coating was tested as described in Comparative Example H.

Example 18

To a 100 ml plastic beaker were charged formulated epoxy resin coating, Part A, (40.00 grams of PSX700, PX7003/01 White Resin, available from PPG Industries, Inc.), Flexibilizer A (4.78 grams, available from Momentive, curative, Part B, (4.07 grams of PSX700 Cure, available from PPG Industries, Inc.), N1-[3-(dimethoxy-methyl-silanyl)-propyl] ethane-1,2-diamine (1.38 grams of Silquest* A-2120 silane, available from Momentive) and solvent (5 grams of PPG Amercoat 65 Thinner, available from PPG Industries, Inc.). The mixture was stirred with a conventional metal stirrer blade for approximately 1 minute to provide a low viscosity, uniform blend of the liquid coating for spray application. The coating was tested as described in Comparative Example H.

TABLE 2

Formulation for epoxy-based coating and coating evaluation results.

| | Comp. Ex. H | Ex. 16 | Ex. 17 | Ex. 18 |
|---|---|---|---|---|
| Component, Part A | | | | |
| PX7003/01 White Resin, wt. % | 78.8 | 72.8 | 65.4 | 66.7 |
| Amercoat 65 Thinner | 8.3 | 8.3 | 8.3 | 8.3 |
| Flexibilzer A, wt % | 0.0 | 7.0 | 7.8 | 8.0 |
| Hydroxy-terminated polydimethylsilicone, wt. % | 0.0 | 0.0 | 7.8 | 7.9 |
| Component, Part B | | | | |
| PSX 700 Cure, wt % | 12.9 | 11.9 | 10.7 | 6.8 |
| N-1-[3-(dimethoxy-methyl-silanyl)-propyl]-ethane-1,2-diamine, wt % | 0.0 | 0.0 | 0.0 | 2.3 |
| Conical Madrel Bend Test, 1 inch | | | | |
| 60 hrs at 80° C. | Complete delamination, FAILED | Cracks (2), FAILED | No cracks, PASSED | No cracks, PASSED |
| 1 week at 80° C. | Complete delamination, FAILED | Complete delamination, FAILED | Cracks (2), FAILED | No cracks, PASSED |
| 60° Gloss in QUV-B Test | | | | |
| Initial | 94.8 | 93.7 | 79.4 | 91.2 |
| 4 days in QUV | 79.2 | — | 73.9 | — |
| 7 days in QUV | 73.6 | 80.7 | — | 82.1 |
| 10 days in QUV | 60.4 | 77.7 | — | 79.4 |
| 14 days in QUV | 35.0 | — | 72.5 | — |
| 21 days in QUV | 31.2 | 68.3 | 71.7 | 78.0 |
| **ΔE Color Change based upon L*a*b Color, D65** | | | | |
| 4 days in QUV | 6.7 | — | 7.4 | — |
| 7 days in QUV | 8.1 | 6.7 | — | 10.1 |
| 10 days in QUV | 8.2 | 7.3 | — | 9.3 |
| 14 days in QUV | 8.1 | — | 7.3 | — |
| 21 days in QUV | 8.8-10.1 | 7.4 | 7.6 | 10.5 |

Examples 19 and 20

A coating formulation, Part A and Part B, were prepared by mixing the components shown in Table 3 using a metal stirrer blade.

TABLE 3

Formulation for epoxy-based coating and coating evaluation results.

| | Ex. 19 | Ex. 20 | Comp. Ex. I | Comp. Ex. J |
|---|---|---|---|---|
| Component, Part A | | | | |
| Epoxy resin (a)[1], weight percent | 29.4 | 29.4 | 29.4 | 29.4 |
| Pigment, $TiO_2$[2], weight percent | 25.0 | 25.0 | 25.0 | 25.0 |
| Silicone Resin D[3], weight percent | 14.6 | 14.6 | 14.6 | 14.6 |
| Flexibilizer B[4], weight percent | 10.9 | | | |
| Flexibilizer C[5], weight percent | | 10.9 | | |
| None | | | 0 | |
| Epoxy-terminated dipropylene glycol | | | | 10.9 |
| Component, Part B | | | | |
| Epikure 3125[6], weight percent | 7.8 | 7.8 | 7.8 | 7.8 |
| 3-(Triethoxy-silanyl)-propylamine, weight percent | 10.3 | 10.3 | 10.3 | 10.3 |
| Dibutyl tin dilaurate, weight percent | 2.0 | 2.0 | 2.0 | 2.0 |

[1] 2-{4-[1-methyl-1-(4-oxiranylmethoxy-cyclohexyl)-ethyl]-cyclohexyloxymethyl}-oxirane
[2] R-KB-4, available from Kronnos
[3] Partial hydrolyzate and condensate of dimethyldimethoxysilane (33 mole %), diphenyldimethoxysilane (34 mole %), phenyltrimethoxysilane (33 mole %), where the residual methoxy content is 15 mole %.
[4] Structure: $HO-Si(CH_3)_2-O-[Si(CH_3)_2O]_m-[Si(Ph)_2O]_n-Si(CH_3)_2-OH$ where m/n is 4.42
[5] Structure: $CH_3O-Si(CH_3)_2-O-[Si(CH_3)_2O]_m-[Si(Ph)_2O]_n-Si(CH_3)_2-OCH_3$, where m/n is 2.99.
[5] Partial hydrolyzate and condensate of dimethyldimethoxysilane and diphenyldimethoxysilane
[6] Reaction product of C18 unsaturated fatty acid dimers with polyamines, amine value of 330-336 mg/g as determined by ASTM D2896.

A set of steel panels were coated with 150 microns wet film thickness of the prepared coating compositions. The coating compositions were then dried and cured as indicated in Table 4. The resulting coatings were tested for flexibility, impact resistance and Konig hardness. The results are shown in Table 4.

TABLE 4

Results of testing cured epoxy-based coatings

| | Flexibility[1] Crack length (mm) after 48 hours at 80° C. and 90% relative humidity | Impact Resistance[2] Energy (Nm) | | König Hardness[3] cycles | |
|---|---|---|---|---|---|
| | | Intrusion | Extrusion | Initial | After 48 h at 80° C., 90% RH |
| Example No. | | | | | |
| Comp. Ex. I | 64 | 9 | 1.5 | 16 | 128 |
| Comp. Ex. J | 110 | >10 | >10 | 9 | 119 |
| Ex. 19 | No cracking | >10 | 8 | 8 | 120 |
| Ex. 20 | No cracking | 10 | 8 | 6 | 119 |

[1] Concial Mandrel Flexibility as described above.
[2] Tested in accordance with ASTM D2794.
[3] The König hardness was measured in accordance with DIN 53157.

The data presented in Table 4 illustrate that a formulated coating containing the a flexibilizer (c), such as Examples 19 and 20, had flexibility (no cracking) and hardness, while similar coatings which did not contain a flexibilizer (c), such as comparative Examples I and J, showed cracking when exposed to high humidity and 80° C. for 48 hours.

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. An epoxy-based composition comprising:
   (a) an epoxide resin having at least one 1,2-epoxy group per molecule with an epoxide equivalent weight in the range of from 100 to 2000;
   (b) an amino-functional alkoxysilane;
   (c) a flexibilizer having the general Formula (I):

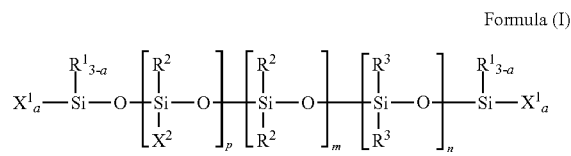

Formula (I)

wherein:
   each occurrence of $R^1$ is independently an alkyl group having from 1 to 6 carbon atoms, a phenyl group or an arenyl group having 7 to 12 carbon atoms;
   each occurrence of $R^2$ is independently an alkyl group having from 1 to 6 carbon atoms;
   each occurrence of $R^3$ is independently a phenyl group or an arenyl group having 7 to 12 carbon atoms;
   each $X^1$ is independently a hydroxyl group, an alkoxy group having from 1 to 6 carbon atoms, or an alkoxy group having from 1 to 6 carbon atoms and at least one ether or ester functional group;
   each $X^2$ is independently a hydroxyl group, an alkoxy group having from 1 to 6 carbon atoms, an alkoxy group having from 1 to 6 carbon atoms and at least one ether or ester functional group, or a group with the Formula (II):

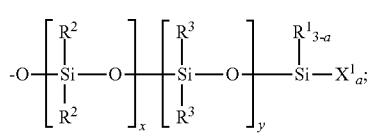
Formula (II)

each occurrence of the subscripts a, m, n, p, x and y is independently an integer wherein a is 1 to 3; m is 0 to 500, n is 1 to 500, p is 0 to 10, x is 0 to 50, and y is 0 to 50 with the provisos that
(i) the molar ratio of m to n is from 0 to 15, and
(ii) the molar ratio of p to n is from 0 to 1; and
(iii) the flexibilizer (c) has a silanol content or a $SiX^1$ content of from 2 to 15 mole %, based upon the total number of silicon atoms; and
(d) at least one curing catalyst.

2. The epoxy-based composition of claim 1 wherein the epoxy resin (a) has the general Formula (III):

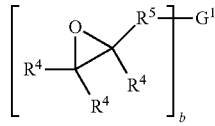
Formula (III)

wherein:
each occurrence of $R^4$ is independently hydrogen, an alkyl group of from 1 to 8 carbon atoms, a phenyl group or an aralkyl or arenyl group of from 7 to 12 carbon atoms;
each occurrence of $R^5$ is a divalent organic group of from 1 to 12 carbon atoms or a chemical bond;
$G^1$ is a divalent or polyvalent organic group containing from 1 to 1,000 carbon atoms; and b is 2 to 8.

3. The epoxy-based composition of claim 2 wherein $R^4$ is hydrogen or methyl; $R^5$ is a chemical bond, or a —C(═O)—, —C(═O)O—, —O—, —$C_cH_{2c}$—, —$C_cH_{2c}O$—, —$C_cH_{2c}OC(═O)$—, —$C_cH_{2c}C(═O)$—, —$C_cH_{2c}C(═O)O$— or —$(C_cH_{2c}O)_d$— group, wherein each occurrence of c and d is independently an integer where c is from 1 to 8 and d is from is 1 to 6; and $G^1$ is a divalent or polyvalent hydrocarbon group containing from 1 to 700 carbon atoms derived from an linear or branched alkylcycloalkyl, alkenyl aralkyl, aryl, arenyl or a group derived from a heterocarbon containing from 1 to 700 carbon atoms at least one functional group selected from the group consisting of —O—, N═, —OH, —S—, —C(═O)—, —C(═O)O—, —C(═O)OH, and —C(═O)S—, and b is 2 to 5.

4. The epoxy-based composition of claim 2 wherein $G^1$ is selected from the group consisting of hydrogenated cyclohexane dimethyl, hydrogenated Bisphenol A, bisphenol A,

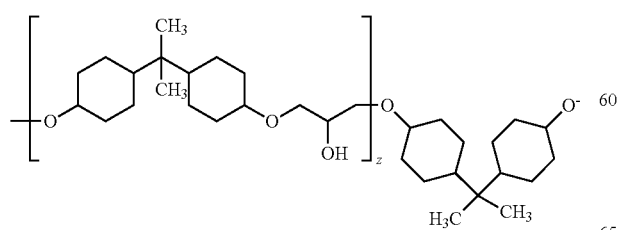

where z is 0 to 12;

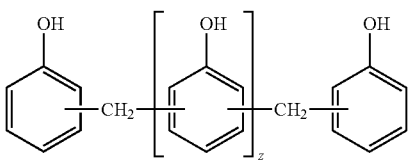

where z is 0 to 1.2:

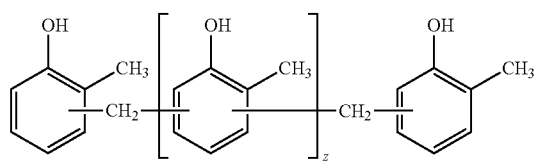

where z is 0 to 12;

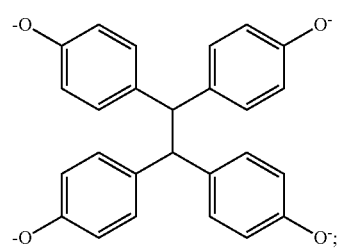

where z is 0 to 10;

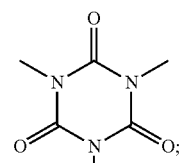

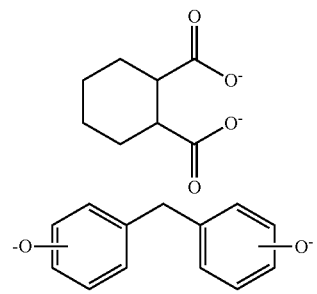

-continued

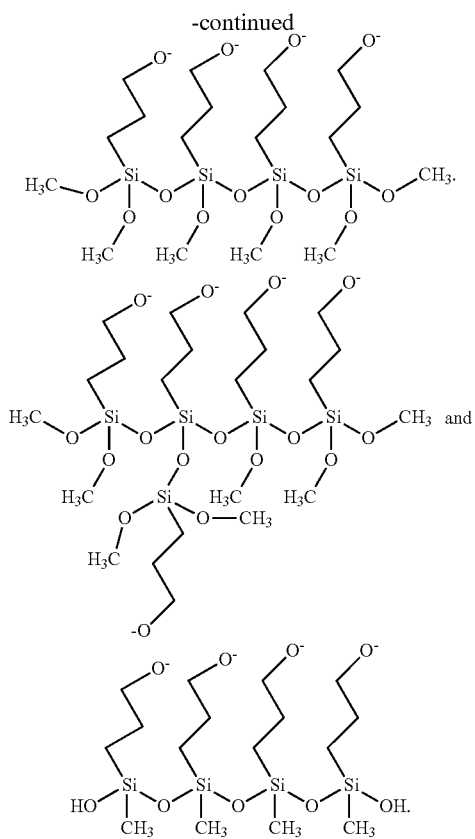

5. The epoxy-based composition of claim 1 wherein the epoxy resin (a) is selected from the group consisting of 2-{4-[1-methyl-1-(4-oxiranylmethoxy-cyclohexyl)-ethyl]-cyclohexyloxymethyl}-oxirane, diglycidyl ether of bisphenol A, hydrogenated diglycidyl ether of bisphenol A, epoxy phenol novolac resins, epoxy cresol novolac resins, diglycidyl ether of bisphenol F, tetradlycidyl ether of tetrakis(4-hydroxyphenyl)ethane, triglycidyl-p-aminophenol, N,N,N',N'-tetraglycidyl-4,4'-diaminodiphenylmethane, triglycidyl isocyanurate, and diglycidyl ether of hexahydrophthalic acid.

6. The epoxy-based composition of claim 1 wherein epoxy resin (a) is present in the composition in an amount ranging from 10 to 80 percent by weight.

7. The epoxy-based composition of claim 1, wherein the amino-functional alkoxysilane has the general Formulae (IV) or (V):

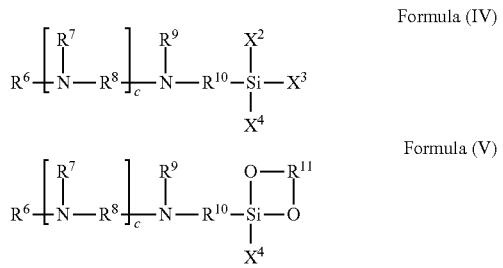

wherein:
each $R^6$, $R^7$ and $R^9$ is independently a hydrogen or a monovalent hydrocarbon group containing from 1 to 12 carbon atoms selected from the group consisting of straight chain alkyl, branched chain alkyl, cycloalkyl, aralkyl, alkenyl, aryl and arenyl;

each $R^8$ and $R^{10}$ is independently a divalent hydrocarbon group containing from 1 to 12 carbon atoms selected from the group consisting of straight chain alkylene, branched chain alkylene, cyloalkylene, aralkylene, alkenylene, arylene or arenylene;

$R^{11}$ is a divalent hydrocarbon group containing from 1 to 12 carbon atoms selected from the group consisting of straight chain alkylene, branched chain alkylene, cyloalkylene, aralkylene, alkenylene, arylene or arenylene or a divalent organic group containing from 1 to 12 carbon atoms and at least one functional group selected from hydroxyl group, other group and ester group;

$X^2$ is $-OR^{12}$, wherein $R^{12}$ is a hydrogen, a monovalent hydrocarbon group containing from 1 to 12 carbon atoms selected from the group consisting of straight chain alkyl, branched chain alkyl, cycloalkyl, aralkyl, alkenyl, aryl and arenyl or a monovalent organic group containing from 1 to 12 carbon atoms and at least one functional group selected from hydroxyl group, ether group and ester group;

each $X^3$ and $X^4$ is independently $X^2$, a methyl or a phenyl group; and the subscript c is an integer wherein c is 1 to 3.

8. The epoxy-based composition of claim 7 wherein the amino-functional alkoxysilane (b) is selected from the group consisting of (methoxy-dimethyl-silanyl)-methylamine, (dimethoxy-methyl-silanyl)-methylamine, (trimethoxy-silanyl)-methylamine, 2-(methoxy-dimethyl-silanyl)-ethylamine, 3-(dimethoxy-methyl-silanyl)-ethylamine, 2-(trimethoxy-silanyl)-ethylamine, 3-(methoxy-dimethyl-silanyl)-propylamine, 3-(dimethoxy-methyl-silanyl)-propylamine, 3-(trimethoxy-silanyl)-propylamine, (ethoxy-dimethyl-silanyl)-methylamine, (diethoxy-methyl-silanyl)-methylamine, (triethoxy-silanyl)-methylamine, 2-(ethoxy-dimethyl-silanyl)-ethylamine, 3-(diethoxy-methyl-silanyl)-ethylamine, 2-(triethoxy-silanyl)-ethylamine, 3-(ethoxy-dimethyl-silanyl)-propylamine, 3-(diethoxy-methyl-silanyl)-propylamine, 3-(triethoxy-silanyl)-propylamine, 3-(dipropoxy-methyl-silanyl)-propylamine, 3-(tripropoxy-silanyl)-propylamine, 3-(2-methyl-[1,3,2]dioxasilolan-2-yl)-propylamine, 3-(2-ethoxy-[1,3,2]dioxasilolan-2-yl)-propylamine, 3-(2-ethoxy-[1,3,2]dioxasilinan-2-yl)-propylamine, 3-(2-ethoxy-5-methyl-[1,3,2]dioxasilinan-2-yl)-propylamine, 3-[2-(3-amino-propyl)-5-methyl-[1,3,2]dioxasilinan-2-yloxy]-2-methyl-propan-1-ol, 3-(2-ethoxy-4,4,6-trimethyl-[1,3,2]dioxasilinan-2-yl)-propylamine, [3-(2-ethoxy-5-methyl-[1,3,2]dioxasilinan-2-yl)-2-methyl-propyl]-ethyl-amine, [3-(dimethoxy-methyl-silanyl)-2-methyl-propyl]-ethyl-amine, [3-(diethoxy-methyl-silanyl)-2-methyl-propyl]-ethyl-amine, [3-(diethoxy-methyl-silanyl)-propyl]-phenyl-amine, [3-(triethoxy-silanyl)-propyl]-phenyl-amine, N1-[3-(dimethoxy-methyl-silanyl)-propyl]-ethane-1,2-diamine, N1-[3-(trimethoxy-silanyl)-propyl]-ethane-1,2-diamine, N1-[3-(diethoxy-methyl-silanyl)-propyl]-ethane-1,2-diamine, N1-[3-(triethoxy-silanyl)-propyl]-ethane-1,2-diamine, N1-[3-(dipropoxy-methyl-silanyl)-propyl]-ethane-1,2-diamine, N1-[3-(tripropoxy-silanyl)-propyl]-ethane-1,2-diamine, N1-[3-(2-methyl-[1,3,2]dioxasilolan-2-yl)-propyl]-ethane-1,2-diamine, N1-[3-(2-ethoxy-[1,3,2]dioxasilolan-2-yl)-propyl]-ethane-1,2-diamine, N1-[3-(2-methyl-5-methyl-[1,3,2]dioxasilinan-2-yl)-propyl]-ethane-1,2-diamine, N1-[3-(2-ethoxy-5-methyl-[1,3,2]dioxasilinan-2-yl)-propyl]-ethane-1,2-diamine, and mixtures thereof.

9. The epoxy-based composition of claim 1 wherein the amino-functional silane (b) is present in the epoxy-based composition in an amount ranging from 1 to 30 percent by weight, with the weight percents being based on the total weight of components (a), (b), (c) and (d) of the epoxy-based composition.

10. The epoxy-based composition of claim 1 wherein $X^1$ is hydroxyl, methoxy, ethoxy, propoxy or isopropoxy; $R^1$ is methyl or phenyl; $R^2$ is methyl; $R^3$ is phenyl; in is 1 to 100; n is 2 to 100; p is 0; and the molar ratio of m to n is from 1 to 10 in the structure of the flexibilizer (c).

11. The epoxy-based composition of claim 10 wherein $X^1$ is hydroxyl, methoxy or ethoxy and the molar ratio of m to a is 2 to 7.

12. The epoxy-based composition of claim 1 wherein the curing catalyst (d) selected organic tin, zirconium complex, aluminum chelate, titanic chelate, organic zinc, organic cobalt, organic iron, organic nickel and organobismuth, amine catalyst, and mixtures thereof.

13. The epoxy-based composition of claim 1, wherein the curing catalyst (d) is selected from the group consisting of dibutyltin oxide, dimethyltin diacetate, dimethyltin dilaurate, dimethyltin dineodecanote, dibutyltin dilaurate, dioctyltin dilaurate, dibutyltin diacetate, stannous octoate, stannous acetate, stannous oxide, morpholine, tri-isopropylamine, bis-(2-dimethylaminoethyl) ether and piperazine.

14. The epoxy-based composition of claim 1, wherein the amount of curing catalyst (d) is from 0.05 weight percent to 10 weight percent based on the total weight of components (a), (b), (c) and (d).

15. The epoxy-based composition of claim 1, further comprising at least one additional component selected from the group consisting of a solvent, a polysiloxane resin, a non-silicon-based epoxy hardner, an organic surfactant, a colorant, a plasticizer, an extender, a filler, a hydrocarbon resin modifier, a UV stabilizer, a wetting agent, a flow and leveling additive, a thixotrope and a defoamer.

16. The epoxy-based composition of claim 15, wherein the polysiloxane resin has the general Formula (VI):

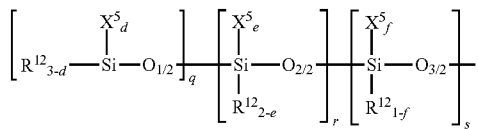

Formula (VI)

wherein:
each occurrence of $R^{12}$ is monovalent hydrocarbon selected from the group consisting of a straight chain alkyl, branched chain alkyl, and cyclo alkyl groups having 1 to 10 carbon atoms, phenyl, and arenyl group containing from 7 to 10 carbon atoms;
each occurrence of $X^5$ is a hydrolysable group —$OR^{12}$; and
each occurrence of the subscripts d, e, f, q, r and s is independently an integer wherein d is 0 to 3, e is 0 to 2, f is 0 or 1; q is 0 to 25; r is 0 to 100; s is 0 to 100, with the provisos that
(i) $4 \leq q+r+s \leq 125$;
(ii) the quotient $(dq+er+fs)/(3q+2r+s)$ is from 0.05 to 0.6; and
(iii) all the half oxygen atoms, $O_{1/2}$, in a repeat unit are matched with another half oxygen atom in a different repeat unit to form a full oxygen atom, —O—, which covalently links two repeat units together.

17. The epoxy-based composition of claim 16, wherein the polysiloxane resin amount ranges from 1 to 50 percent by weight, with the weight percents being based on the total weight of components (a), (b), (c), (d) and polysiloxane resin of the epoxy-based composition.

18. The epoxy-based composition of claim 1, wherein the epoxy-based composition is a two part composition wherein (1) a first part comprises epoxy resin (a) and flexibilizer (c); and (2) a second part comprises the amino-functional alkoxysilane (b).

19. The epoxy-based composition of claim 1, wherein the epoxy-based composition is an adhesive, a sealant, a composite or a coating.

20. A substrate at least partially coated with the coating composition of claim 19.

21. A cured epoxy-based composition of claim 1.

22. An epoxy-based composition comprising:
(a) an epoxide resin having at least one 1,2-epoxy group per molecule with an epoxide equivalent weight in the range of from 100 to 2000;
(b) an amino-functional alkoxysilane;
(c) a flexibilizer having the general Formula (I):

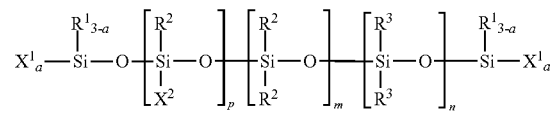

Formula (I)

wherein:
each occurrence of $R^1$ is independently an alkyl group having from 1 to 6 carbon atoms, a phenyl group or an arenyl group having 7 to 12 carbon atoms;
each occurrence of $R^2$ is independently an alkyl group having from 1 to 6 carbon atoms
each occurrence of $R^3$ is independently a phenyl group or an arenyl group having 7 to 12 carbon atoms;
each $X^1$ is independently a hydroxyl group, an alkoxy group having front 1 to 6 carbon atoms, or an alkoxy group having from 1 to 6 carbon atoms and at least one ether or ester functional group;
each $X^2$ is independently a hydroxyl group, an alkoxy group having from 1 to 6 carbon atoms, an alkoxy group having from 1 to 6 carbon atoms and at least one ether or ester functional group, or a group with the Formula (II):

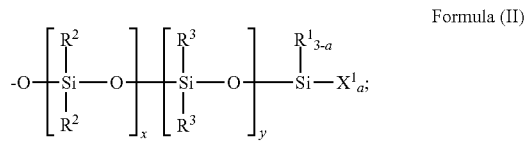

Formula (II)

each occurrence of the subscripts a, m, n, p, x and y is independently an integer wherein a is 1 to 3; m is 0 to 500, n is 1 to 500, p is 0 to 10, x is 0 to 50, and y is 0 to 50 with the provisos that
(i) the molar ratio of m to n is from 0 to 15, and
(ii) the molar ratio of p to n is from 0 to 1; and
(iii) amount of flexibilizer (c) is from 0.08 moles to 2 moles of flexibilizer (c) per mole amino-functional alkoxysilane (b); and
(d) at least one curing catalyst.

23. The epoxy-based composition of claim 22 amount of flexibilizer (c) is from 0.01 moles to 1.0 moles of flexibilizer (c) per mole of amino-functional alkoxysilane.

24. The epoxy-based composition of claim 22 wherein the epoxy resin (a) has the general Formula (III):

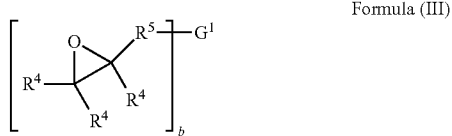

Formula (III)

wherein:
  each occurrence of $R^4$ is independently hydrogen, an alkyl group of from 1 to 8 carbon atoms, a phenyl group or an aralkyl or arenyl group of from 7 to 12 carbon atoms;
  each occurrence of $R^5$ is a divalent organic group of from 1 to 12 carbon atoms or a chemical bond;
  $G^1$ is a divalent or polyvalent organic group containing from 1 to 1,000 carbon atoms; and b is 2 to 8;
  the amino-functional alkoxysilane has the general Formulae (IV) or (V):

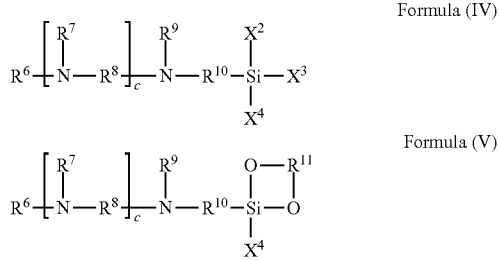

Formula (IV)

Formula (V)

wherein:
  each $R^6$, $R^7$ and $R^9$ is independently a hydrogen or a monovalent hydrocarbon group containing from 1 to 12 carbon atoms selected from the group consisting of straight chain alkyl, branched chain alkyl, cycloalkyl, aralkyl, alkenyl, aryl and arenyl;
  each $R^8$ and $R^{10}$ is independently a divalent hydrocarbon group containing from 1 to 12 carbon atoms selected from the group consisting of straight chain alkylene, branched chain alkylene, cyloalkylene, aralkylene, alkenylene, arylene or arenylene;
  $R^{11}$ is a divalent hydrocarbon group containing from 1 to 12 carbon atoms selected from the group consisting of straight chain alkylene, branched chain alkylene, cyloalkylene, aralkylene, alkenylene, arylene or arenylene or a divalent organic group containing from 1 to 12 carbon atoms and at least one functional group selected from hydroxyl group, ether group and ester group;
  $X^2$ is —$OR^{12}$, wherein $R^{12}$ is a hydrogen, a monovalent hydrocarbon group containing from 1 to 12 carbon atoms selected from the group consisting of straight chain alkyl, branched chain alkyl, cycloalkyl, aralkyl, alkenyl, aryl and arenyl or a monovalent organic group containing from 1 to 12 carbon atoms and at least one functional group selected from hydroxyl group, ether group and ester group;
  each $X^3$ and $X^4$ is independently $X^2$, a methyl or a phenyl group; and
  the subscript c is an integer wherein c is 1 to 3; and
  the curing catalyst (d) selected organic tin, zirconium complex, aluminum chelate, titanic chelate, organic zinc, organic cobalt, organic iron, organic nickel and organobismuth, amine catalyst, and mixtures thereof.

25. The epoxy-based composition of claim 24 wherein epoxy resin (a) is present in the composition in an amount ranging from 10 to 80 percent by weight, the amino-functional silane (b) is present in the epoxy-based composition in an amount ranging from 1 to 30 percent by weight and the amount of curing catalyst (d) is from 0.05 weight percent to 10 weight percent wherein the weight percents are based on the total weight of components (a), (b), (c) and (d).

26. The epoxy-based composition of claim 22 wherein $X^1$ is hydroxyl, methoxy, ethoxy, propoxy or isopropoxy; $R^1$ is methyl or phenyl; $R^2$ is methyl; $R^3$ is phenyl; m is 1 to 100; n is 2 to 100; p is 0; and the molar ratio of m to n is from 1 to 10 in the structure of the flexibilizer (c).

27. The epoxy-based composition of claim 22 wherein the epoxy resin (a) is selected from the group consisting of 2-{4-[1-methyl-1-(4-oxiranylmethoxy-cyclohexyl)-ethyl]-cyclohexyloxymethyl}-oxirane, diglycidyl ether of bisphenol A, hydrogenated diglycidyl ether of bisphenol A, epoxy phenol novolac resins, epoxy cresol novolac resins, diglycidyl ether of bisphenol F, tetradlycidyl ether of tetrakis(4-hydroxyphenyl)ethane, triglycidyl-p-aminophenol, N,N,N',N'-tetraglycidyl-4,4'-diaminodiphenylmethane, triglycidyl isocyanurate, and diglycidyl ether of hexahydrophthalic acid.

28. A cured epoxy-based composition of claim 22.

* * * * *